(12) United States Patent
Tse

(10) Patent No.: US 10,432,553 B2
(45) Date of Patent: Oct. 1, 2019

(54) SYSTEMS AND METHODS FOR TRANSPORTATION OF MULTIPLE CONSTANT BITRATE DATA STREAMS

(71) Applicant: MICROSEMI SOLUTIONS (U.S.), INC., Aliso Viejo, CA (US)

(72) Inventor: Richard Tsz Shiu Tse, Vancouver (CA)

(73) Assignee: MICROSEMI SOLUTIONS (U.S.), INC., Aliso Viejo, CA (US)

( * ) Notice: Subject to any disclaimer, the term of this patent is extended or adjusted under 35 U.S.C. 154(b) by 310 days.

(21) Appl. No.: 15/438,165

(22) Filed: Feb. 21, 2017

(65) Prior Publication Data
US 2017/0244648 A1 Aug. 24, 2017

Related U.S. Application Data

(60) Provisional application No. 62/298,767, filed on Feb. 23, 2016.

(51) Int. Cl.
*H04L 12/927* (2013.01)
*H04L 12/841* (2013.01)
*H04L 12/801* (2013.01)
*H04L 12/805* (2013.01)
*H04N 21/2365* (2011.01)
*H04N 21/434* (2011.01)

(52) U.S. Cl.
CPC ............ *H04L 47/801* (2013.01); *H04L 47/10* (2013.01); *H04L 47/28* (2013.01); *H04L 47/36* (2013.01); *H04N 21/2365* (2013.01); *H04N 21/4347* (2013.01)

(58) Field of Classification Search
CPC ......... H04L 47/10; H04L 47/28; H04L 47/36; H04L 47/801; H04N 21/2365; H04N 21/434
USPC ....................................................... 709/223
See application file for complete search history.

(56) References Cited

U.S. PATENT DOCUMENTS

| | | | | |
|---|---|---|---|---|
| 6,038,231 A | * | 3/2000 | Dolby | ................. H04L 12/5602 370/394 |
| 7,224,703 B2 | * | 5/2007 | Antal | ................. H04L 12/6418 370/468 |
| 8,340,118 B2 | * | 12/2012 | Zhou | ..................... H04J 3/1647 370/442 |

(Continued)

*Primary Examiner* — Dustin Nguyen
*Assistant Examiner* — Hao H Nguyen
(74) *Attorney, Agent, or Firm* — Leber IP Law; David C. Robertson

(57) ABSTRACT

Systems and methods are provided for transparently transmitting multiple constant bitrate (CBR) data streams over a packet network with reduced delay. Example embodiments provide packetizers and depacketizers for multiplexing and demultiplexing multiple common public radio interface (CPRI) data streams for transport between remote units and baseband units over packet networks. The systems and methods disclosed herein use time-division-multiplexing to map multiple CBR clients directly into a packet such that each CBR client can be recovered at the destination with its original clock and with information that allows its residence time in the packet domain to be calculated. The systems and methods disclosed herein allow packet based networks, such as the existing Packet Transport Network (PTN), to be used for C-RAN fronthaul applications with strict end-to-end delay requirements.

9 Claims, 11 Drawing Sheets

(56) References Cited

U.S. PATENT DOCUMENTS

| | | | | |
|---|---|---|---|---|
| 8,509,114 | B1* | 8/2013 | Szajdecki | H04J 3/22 370/254 |
| 2003/0044166 | A1* | 3/2003 | Haddad | H04N 5/76 386/219 |
| 2003/0147372 | A1* | 8/2003 | Pattavina | H04J 3/0602 370/345 |
| 2003/0229840 | A1* | 12/2003 | Pattavina | H03M 13/2912 714/776 |
| 2006/0133421 | A1* | 6/2006 | Homer | H04L 12/427 370/474 |
| 2012/0250678 | A1* | 10/2012 | Sabella | H04L 47/10 370/352 |
| 2019/0097744 | A1* | 3/2019 | Abdullah | H04J 3/0661 |

* cited by examiner

400A

| | field | Starting Octet # | # of bytes | # of valid bytes |
|---|---|---|---|---|
| Ethernet overhead | DA | 1 | 6 | 6 |
| | SA | 7 | 6 | 6 |
| | EtherTYPE | 13 | 2 | 2 |
| | Sequence Number | 15 | 2 | 2 |
| | Timestamp Channel # | 17 | 1 | 1 |
| | Timestamp | 18 | 10 | 10 |
| this packet has 3 clients with 9 timeslots/client | timeslot[0], channel #1 | 28 | 8 | 0, 6, 7, or 8 |
| | timeslot[1], channel #2 | 36 | 8 | 0, 6, 7, or 8 |
| | timeslot[2], channel #3 | 44 | 8 | 0, 6, 7, or 8 |
| | timeslot[3], channel #1 | 52 | 8 | 0, 6, 7, or 8 |
| | timeslot[4], channel #2 | 60 | 8 | 0, 6, 7, or 8 |
| | timeslot[5], channel #3 | 68 | 8 | 0, 6, 7, or 8 |
| | timeslot[6] to timeslot[23] | 76 | 8 x 3 x 8 | 0, 6, 7, or 8 per timeslot |
| | timeslot[24], channel #1 | 220 | 8 | 0, 6, 7, or 8 |
| | timeslot[25], channel #2 | 228 | 8 | 0, 6, 7, or 8 |
| | timeslot[26], channel #3 | 236 | 8 | 0, 6, 7, or 8 |
| | control field | 244 | 8 | 2-bits of stuff info per timeslot. 1-bit of fault info per client. |
| | redundant control field | 252 | 8 | 3-bits per timeslot x #timeslots |
| | FCS | 260 | 2 | 2 |

FIG. 4A

SYSTEMS AND METHODS FOR TRANSPORTATION OF MULTIPLE CONSTANT BITRATE DATA STREAMS

FIELD

The present disclosure relates to telecommunications, and in particular optical communications. Certain embodiments provide systems and methods for fronthaul of mobile traffic between remote radio units and centralized baseband units.

BACKGROUND

C-RAN, which can stand for Centralized Radio Access Network, Cloud Radio Access Network, Clean Radio Access Network, Coordinated Radio Access Network, and Collaborative Radio Access Network, is a concept that places most of the processing functions of a cellular radio system in a central location, serviced by open platform cloud-based servers with virtualization capability. Compared to a traditional radio access network (RAN), the C-RAN is expected to significantly reduce the cost of servicing the RAN by raising the computing efficiency and, thus, reducing the overall power consumption, reducing the amount of real estate at the remote cell sites, and reducing the amount of equipment required.

Fronthaul is a term used to refer to the communication network that connects the remote radios to the centralized baseband processing functions. Because of its low cost and its ubiquitousness, the use of Ethernet as the transport mechanism is desired. Standards bodies, including the IEEE 802.1CM, IEEE 1904.3, IEEE 802.1Qbu, IEEE 802.1Qbv and IEEE 802.3br working groups, are currently defining how Ethernet is used in the C-RAN's fronthaul network and the mechanisms that can control and reduce the Ethernet network delay and delay variation for the C-RAN application.

A C-RAN implementation is fraught with some very difficult technological challenges. Three of the most significant challenges for C-RAN implementation are: stringent limitations on the maximum delay of the uplink and downlink communication paths between the radio and the centralized processors; stringent performance bounds on the radio's frequency characteristics; and stringent requirements for measuring the delay of the uplink and downlink communication paths between the radio and the centralized processors.

Delay requirements for fronthaul applications are based in part on a mechanism known as Hybrid Automatic Repeat Request (HARQ), which is used for error detection and correction. Details on how HARQ operates are not relevant to the present disclosure except for the limits that it sets on the round-trip information exchange time. For LTE mobile networks, the allowed time for a round-trip (radio-to-controller+controller-to-radio) HARQ information exchange is 4 ms. How this 4 ms time interval is segmented and allocated in a typical mobile radio network is also not relevant to the present disclosure except for the commonly accepted allocation of 150 µs to 200 µs for the one-way fronthaul network delay. This 150 µs to 200 µs of aggregated delay includes the delay for up to 20 km of optical fiber. Assuming a typical optical propagation time of 5 µs/km, the optical fiber could use 100 µs of this delay, leaving only 50 µs to 100 µs of time for the other functions in the fronthaul network. Some sources of delay in a packetized fronthaul network are discussed below.

The radio's frequency characteristics are controlled by the centralized processing resources. The maximum RMS frequency error at the radio is ±50 ppb from the given reference. It is commonly accepted that the reference clock recovered from the wireline link must have an average frequency error of less than ±16 ppb. The Common Public Radio Interface (CPRI) standard, which is currently used as a constant bitrate (CBR) protocol to carry radio data, requires an RMS frequency error of less than 2 ppb below 300 Hz.

The delay of the uplink and downlink communication paths between the radio and the centralized processors must be measured with a sufficient precision for use in C-RAN implementations. The delay of the communication path between the radio and the centralized processing functions must be known to better than ±65 ns.

Packet networks introduce delay in several common ways, including packet generation, channelized packet multiplexing, packet termination, and storing and forwarding. When a CBR data stream is packetized, enough bytes of the data stream must be first accumulated in order to generate a packet. The delay to generate the packet is affected by both the packet size and the bit rate of the data stream. The delay increases as the packet size grows and as the bit rate of the data stream decreases. In the typical situation where only one client is allocated to a single packet stream, a substantial delay can be incurred on any client as it waits for its packet to be multiplexed onto the aggregated packet stream. Clients of lower priority may be further penalized as they may need to wait for higher priority clients' packets to be sent first.

If there are N clients of equal priority, any client may need to wait N−1 packets before it gets its turn to be put onto the aggregated stream. This wait time can vary depending on the presence or absence of other packet streams and the priority of each packet stream. This variance is known as packet delay variance (PDV). Decreasing the packet sizes in the packet streams will decrease the overall wait time but, because small packets have a higher percentage of overhead bytes, the network becomes less efficient, which is highly undesirable.

At the destination, a packet is fully received and checked for errors before it is terminated and its payload made available for processing. Hence, the larger the packet, the longer it takes to begin processing of the payload.

While transiting through a packet network (e.g. intermediate packet switches), each packet is typically fully received before it is forwarded (a.k.a. store-and-forward). Hence, packet termination, packet generation, and the channelized packet multiplexing delays are typically incurred on each packet at each intermediate transit node.

Cut-through methods, which do not wait for all of the payload within a packet to arrive before generating the packet and do not wait for the entire packet to be received before processing the packet payload, are used in some specialized networks. However, these networks are more difficult to implement and manage and are far less flexible. Error propagation is not well controlled and the client and the packet network are intricately tied together timing-wise to ensure neither will run out of data while executing the cut-through processes. The traffic must be well-behaved and the packet network must never be oversubscribed to take advantage of cut-through delay reduction.

Because of the factors mentioned above, transit of data through a packet network typically takes more time than through a TDM network.

Various solutions for reducing delay in an Ethernet network have been proposed. Some standards based efforts are discussed in the following paragraphs.

In a mechanism proposed by IEEE 802.1Qbu, delay and PDV of high priority (express) traffic is reduced by using frame preemption. High priority traffic can interrupt lower priority (preemptable) traffic. However, if a significant amount of traffic is of the express variety, which is the case for the C-RAN fronthaul application, this mechanism offers little benefit. This mechanism requires new equipment throughout the network.

In a mechanism proposed by IEEE 802.1Qbv, delay and PDV for any class of traffic may be reduced by providing scheduled access to the Ethernet stream. However, if a significant amount of traffic is of the same class, this mechanism offers little benefit. This mechanism requires new equipment throughout the network.

In a mechanism proposed by IEEE 802.3br, delay and PDV is reduced by allowing segmentation of large non-express Ethernet frames into smaller Ethernet frames, which are then reassembled at the destination. This mechanism requires new equipment throughout the network. This mechanism still incurs a minimum delay of 64 bytes per packet segment. So, if there are N clients, the multiplexing wait time can still be as large as (N−1)×64 bytes. Ethernet frames of size less than 128 bytes cannot be preempted and segmented. Packet reassembly still requires the entire packet to be received before it can be terminated and the payload processed. If a significant amount of traffic is of the express class, this mechanism offers little benefit.

The inventors have determined a need for improved methods and systems for using packet networks for transporting CBR data streams, particularly for fronthaul in C-RAN applications.

BRIEF DESCRIPTION OF THE DRAWINGS

Embodiments of the present disclosure will now be described, by way of example only, with reference to the attached Figures.

FIG. 4A shows an example generic Ethernet frame generated by a packetizer according to another embodiment of the present disclosure.

DETAILED DESCRIPTION

Introduction and Overview

Many telecommunications companies would like to service the emerging and evolving C-RAN application with a packetized fronthaul network (e.g. Ethernet). However, the delay of transporting many CBR clients over a packet network is large relative to the targets of this application because of packetizing and packet multiplexing functions inherent to packet networks. The C-RAN application also requires that the frequency characteristics of each CBR client to be preserved over the packetized transport and that the delay of the packetized transport to be measured. As well, it would be desirable for existing packet networks, without any dramatic upgrades, to be used for this application. The present disclosure provides new methods and systems to allow a packet network to service C-RAN fronthaul applications.

Figure 1:
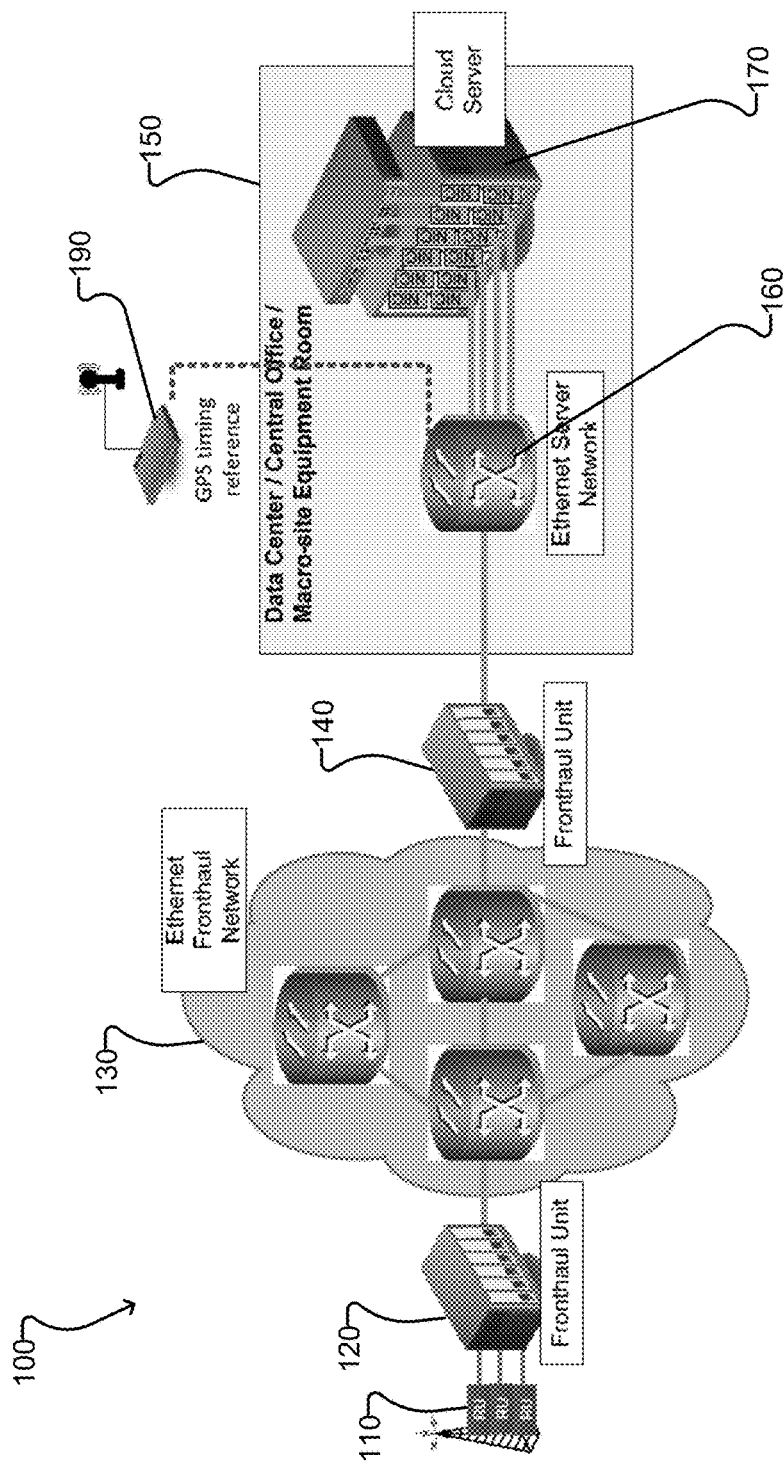
FIG. 1 shows an example C-RAN system with an Ethernet-based fronthaul.

FIG. 1 shows an example C-RAN system 100 using Ethernet for Fronthaul. In system 100, one or more radio units (RU) located at a radio tower 110 are connected to a fronthaul unit 120, which is in turn connected to another fronthaul unit 140 through an Ethernet fronthaul network 130. The fronthaul unit 140 is connected to an Ethernet server network 160 of a central processing station 150. The Ethernet server network 160 is connected to a cloud server 170, and gets a timing signal from a timing reference source 190 (e.g., a GPS timing reference).

The present disclosure pertains to the field of optical communications and is applicable to the fronthaul of mobile traffic between remote radio units and centralized baseband units. Generally, the present disclosure provides systems and methods for transparently transmitting multiple constant bitrate (CBR) data streams over a packet network with reduced delay. Example embodiments provide packetizers and depacketizers for multiplexing and demultiplexing multiple common public radio interface (CPRI) data streams for transport between remote radio units and baseband units over packet networks. The systems and methods disclosed herein use time-division-multiplexing to map multiple CBR clients directly into a packet. This is done in such a way that each CBR client can be recovered at the destination with its original clock and with information that allows its residence time in the packet domain to be calculated. The systems and methods disclosed herein allow packet based networks, such as the existing Packet Transport Network (PTN), to be used for C-RAN fronthaul applications, which has very strict end-to-end delay requirements.

One aspect of the present disclosure provides a method for transparently transmitting multiple constant bitrate (CBR) data streams over a packet network with reduced delay. The method comprises: defining a plurality of timeslots in a packet payload area, each timeslot comprising a predetermined number of consecutive bytes; receiving a plurality of CBR data streams and separating each CBR data stream into a plurality of CBR data segments, each CBR data segment comprising a number of bytes less than or equal to the predetermined number of consecutive bytes in each timeslot of the packet payload area; combining the plurality of CBR data streams into a single packet flow by time division multiplexing the CBR data segments into the timeslots of the packet payload area of each packet of a sequence of packets, such that the packet payload area of each packet contains a plurality of CBR data segments for each of the CBR data streams; for each current packet of the sequence of packets, generating and inserting control data into the packet payload area of the current packet, the control data comprising: timeslot occupation information indicating which bytes of each timeslot of the packet payload area of the current packet contain valid data from the corresponding CBR data segment; and redundant timeslot occupation information indicating which bytes of each timeslot of the packet payload area of a previous packet in the sequence of packets contain valid data from the corresponding CBR data segment; inserting a timestamp from a different one of the CBR data streams and an identification of which different one of the CBR data streams the timestamp corresponds to into a packet overhead area of at least some packets of the sequence of packets, such that the sequence of packets collectively include timestamps from each of the plurality of CBR data streams; and, sequentially transmitting the sequence of packets over the packet network.

Another aspect of the present disclosure provides a method for receiving multiple constant bitrate (CBR) data streams over a packet network with reduced delay. The method comprises: receiving a single packet flow comprising a sequence of packets containing data from a plurality of CBR data streams, each current packet of the sequence of packets having a packet payload area comprising: a plurality of timeslots, each timeslot comprising a predetermined number of consecutive bytes and containing a CBR data segment from a corresponding CBR data stream comprising a number of bytes less than or equal to the predetermined number of consecutive bytes; timeslot occupation information indicating which bytes of each timeslot of the packet payload area of the current packet contain valid data from the corresponding CBR data segment; and redundant timeslot occupation information indicating which bytes of each timeslot of the packet payload area of a previous packet in the sequence of packets contain valid data from the corresponding CBR data segment, wherein a packet overhead area of at least some packets of the sequence of packets includes a timestamp from a different one of the CBR data streams and an identification of which different one of the CBR data streams the timestamp corresponds to, such that the sequence of packets collectively include timestamps from each of the plurality of CBR data streams; extracting the CBR data segments from the timeslots and combining the CBR data segments from corresponding CBR data streams to reconstruct the CBR data streams; and recovering a frequency of each of the CBR data streams based on the timestamps from each of the plurality of CBR data streams, the timeslot occupation information, and in response to detecting a dropped packet, the redundant timeslot occupation information.

Another aspect of the present disclosure provides a packetizer for transparently transmitting multiple constant bitrate (CBR) data streams over a packet network with reduced delay. The packetizer comprises: a frequency input for receiving a frequency reference signal; a timing input for receiving a timing reference signal; for each of a plurality of CBR data streams: a timestamper connected to receive the timing reference signal from the timing input and generate a timestamp for the CBR data stream; a clock rate comparer connected to receive the frequency reference signal from the frequency input and generate a rate indication for the CBR data stream; and, a buffer for buffering payload data from the CBR data stream; a time division multiplexing (TDM) controller connected to receive the rate indication for each CBR data stream from the clock rate comparer for that CBR data stream; and a packet generator connected to receive payload data for each CBR data stream from the buffer for that CBR data stream, and to receive the timestamp for each CBR data steam from the timestamper for that CBR data stream, the packet generator configured to: define a plurality of timeslots in a packet payload area, each timeslot comprising a predetermined number of consecutive bytes; separate each CBR data stream into a plurality of CBR data segments, each CBR data segment comprising a number of bytes less than or equal to the predetermined number of consecutive bytes in each timeslot of the packet payload area; combine the plurality of CBR data streams into a single packet flow by time division multiplexing the CBR data segments into the timeslots of the packet payload area of each packet of a sequence of packets under control of the TDM controller, such that the packet payload area of each packet contains a plurality of CBR data segments for each of the CBR data streams; for each current packet of the sequence of packets, generate and insert control data into the packet payload area of the current packet, the control data comprising: timeslot occupation information indicating which bytes of each timeslot of the packet payload area of the current packet contain valid data from the corresponding CBR data segment; and redundant timeslot occupation information indicating which bytes of each timeslot of the packet payload area of a previous packet in the sequence of packets contain valid data from the corresponding CBR data segment; and insert the timestamp from a different one of the CBR data streams and an identification of which different one of the CBR data streams the timestamp corresponds to into a packet overhead area of at least some packets of the sequence of packets, such that the sequence of packets collectively include timestamps from each of the plurality of CBR data streams.

Another aspect of the present disclosure provides a depacketizer for receiving multiple constant bitrate (CBR) data streams over a packet network with reduced delay. The depacketizer comprises: a frequency input for receiving a frequency reference signal; a timing input for receiving a timing reference signal; a packet input for receiving a single packet flow comprising a sequence of packets containing data from a plurality of CBR data streams, each current packet of the sequence of packets having a packet payload area comprising: a plurality of timeslots, each timeslot comprising a predetermined number of consecutive bytes and containing a CBR data segment from a corresponding CBR data stream comprising a number of bytes less than or equal to the predetermined number of consecutive bytes; timeslot occupation information indicating which bytes of each timeslot of the packet payload area of the current packet contain valid data from the corresponding CBR data segment; and redundant timeslot occupation information indicating which bytes of each timeslot of the packet payload area of a previous packet in the sequence of packets contain valid data from the corresponding CBR data segment, wherein a packet overhead area of at least some packets of the sequence of packets includes a timestamp from a different one of the CBR data streams and an identification of which different one of the CBR data streams the timestamp corresponds to, such that the sequence of packets collectively include timestamps from each of the plurality of CBR data streams; a packet processor for detecting the timestamps from each of the plurality of CBR data streams and extracting the timeslot occupation information and the redundant timeslot occupation information from the packet payload area of each current packet and extracting the timestamps from the packet overhead of each current packet; for each of the plurality of CBR data streams: a buffer for buffering payload data from the CBR data stream; and, an output for outputting the CBR data stream; a time division demultiplexer connected to receive the timeslot occupation information and the redundant timeslot occupation from the packet processor for extracting the CBR data segments from the timeslots and combining the CBR data segments from corresponding CBR data streams to provide a reconstructed CBR data stream to the buffer; and, a differentially recovered clock generator connected to receive the frequency reference signal from the frequency input and to receive the timestamps from the packet processor for determining a recovered frequency for each of the CBR data streams and controlling a clock rate of the output for each CBR data stream based on the recovered frequency for that CBR data stream.

Other aspects and features of the present disclosure will become apparent to those ordinarily skilled in the art upon review of the following description of specific embodiments in conjunction with the accompanying figures.

Systems and methods systems according to certain embodiments the present disclosure may have any or all of the following features:

- time division multiplexing (TDM) is used to directly map multiple CBR clients into a single packet stream;
- the delay reduction benefit increases proportionally with the number of clients;
- the delay is reduced at both the endpoints and in the intermediate packet switching network (e.g., packetization and depacketization delay of the CBR clients is reduced);
- superblock mechanisms can further reduce depacketization delay;
- the frequency of each CBR client is preserved;
- redundant frequency information combats the effects of dropped packets;
- the network's packet multiplexing delay magnitude is reduced;
- the network's packet multiplexing delay variation is reduced;
- the residence time of each CBR client through the packet network can be measured;
- the new functions required to implement this mechanism need only be added at the end points and the intermediate packet switching network does not need to change;
- the traffic management and forwarding resources required by the intermediate packet switching network is reduced as a result of a reduction in the number of independent packet flows, which is a result of time division multiplexing several CBR clients within each packet stream.

In systems and methods disclosed in the present disclosure, two or more CBR clients, which have the same source and destination endpoints in the packet network, are time division multiplexed into the same packet. Time division multiplexing multiple clients into a single packet reduces the client insertion and extraction delay from an integer number of packets to an integer number of bytes, which could be an improvement by a factor of 64 or more (where 64 bytes is the minimum packet size for Ethernet). This reduction in delay grows proportionally with the number of clients that are multiplexed into one packet.

Because the number of independent packet flows is reduced in comparison to a system where each CBR client has its own packet flow, delay through an intermediate packet switching network, which may multiplex these independent packet flows into one physical link, may also be reduced.

Traditional TDM is used in some non-packetized protocols like SDH and OTN to aggregate lower rate clients into a higher rate stream. A very important aspect of the TDM mechanism is the ability to recover the original lower rate client perfectly when it is demultiplexed from the higher rate stream. This means that no bits are added, removed, or changed and the recovered clock of the client must be identical to the original incoming client's clock, within specified bounds.

Clock synchronization may be accomplished, for example, according to IEEE 1588, which is commonly called PTP, which stands for Precision Timing Protocol. IEEE 1588 is a standardized mechanism that enables a timing slave to frequency and phase synchronize itself to a timing master by passing packetized timing messages between the two, timestamping these packetized messages, and passing these timestamps from the master to the slave. In the Ethernet-based Packet Transport Network (PTN) that is commonly used for cellular backhaul applications, phase synchronization is sometimes necessary to enable the radios in the network to phase align and not interfere with one another. In this application, a primary reference source, located at a central location, will distribute Time-of-Day (i.e. phase) to a large number of base-stations through the PTN using IEEE 1588 mechanisms.

Figure 2:
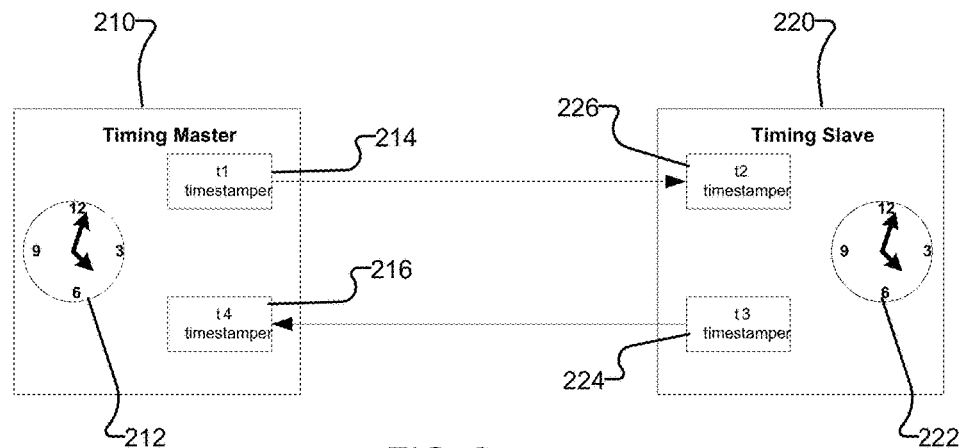
FIG. 2 shows elements of an example timing synchronization system according to the prior art.
Figure 3:
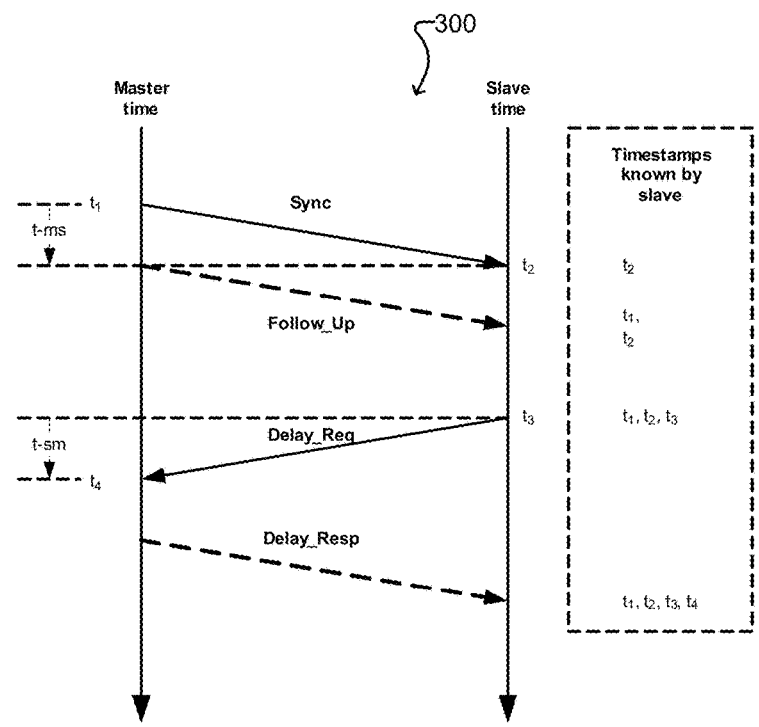
FIG. 3 shows an example message exchange in the system of FIG. 2.

A block diagram of a basic IEEE 1588 communication system, with a Timing Master and a Timing Slave is shown in FIG. 2 and the basic phase synchronization message exchange is shown in FIG. 3. With the values of $t_1$, $t_2$, $t_3$, and $t_4$, a slave can derive its current phase offset relative to its master (i.e. its slave_offset) using the following calculations:

$$t_2 + \text{slave\_offset} = t_1 + \text{one\_way\_link\_delay}$$

where $\text{one\_way\_link\_delay} = ((t_4 - t_1) - (t_3 - t_2))/2$ thus, $$\text{slave\_offset} = (t_1 - t_2 - t_3 + t_4)/2$$

Note that the above calculations assume that the delay of the communication link between the master and the slave to be the same in both directions. Any uncompensated asymmetry between the links will result in phase alignment error at the slave.

A typical TDM mechanism to multiplex the lower rate client (stream A) into the higher rate stream (stream B) is to allocate timeslots or tributaries to it. If stream A is not synchronous to stream B, then an unknown frequency offset, beyond the nominal (ideal) frequency difference, between the two exists. To accommodate this, a stuffing mechanism is usually used. The stuffing mechanism allows the used bandwidth allocated to stream A in stream B to be dynamically adjusted. Extra timeslots or tributaries may be allocated to stream A in stream B to accommodate the extra data when a positive frequency offset in stream A, relative to stream B, exists. Timeslots or tributaries for stream A in stream B may be unallocated to accommodate the deficit of data when a negative frequency offset in stream A, relative to stream B, exists.

The stuffing mechanism typically uses one of two methodologies. In the first, the stuff opportunity for each client occurs at a regular interval (e.g. 1 byte every 125 µs for SONET/SDH) and the state is indicated explicitly at each of these intervals. In the second, the upcoming stuffing pattern is identified using numerical values that indicate that N bytes of the next M bytes of corresponding allocated bandwidth contain valid data (e.g. as done in OTN).

At the demultiplexing function, the nominal (ideal) clock rate of stream A, the nominal (ideal) clock rate of stream B, the actual clock rate of stream B, and the added or removed timeslots or tributaries are taken into consideration to recreate the clock for stream A. The multiplexing and demultiplexing functions inherently add wander to stream A. Specialized filters are normally used to keep this wander generation within specified bounds.

To further reduce the delay, a superblock mechanism similar to that defined in ITU-T G.7041 may be used. This mechanism eliminates the need for a full packet to be received before its payload can be depacketized and processed. ITU-T G.7041 defines superblocks for use in transparent GFP framing. These superblocks break up a GFP frame's client payload information field into multiple same-sized segments. In the 8 B/10 B transparent framing case, the G.7041 superblock mechanism reduces the size of the client payload by transcoding it into 64 B/65 B structure where the 8 B/10 B coding is removed from the actual payload and extra control words are added back in so the coding can be recovered at the destination. Another form of transparent GFP framing with superblocks is given in clause 17.8.1 of ITU-T G.709 for the 64 B/66 B encoded FC 1200 client.

Of particular importance to the present disclosure, each superblock within a packet is independent of other superblocks in that packet and contains all the information necessary to recover the original payload contained within it. This property of superblocks allows the GFP frame termination functions to begin processing the incoming payload at the end of each superblock instead of at the end of a GFP frame. For very large GFP frames with many superblocks, this delay advantage can be thousands of bytes. For example, in the FC 1200 GFP transparent framing case, there are 17 superblocks, each of 516 bytes, in an 8800 byte GFP frame. So, instead of having to wait for 8800 GFP frame bytes to arrive, the processing of the payload can begin after just 24 bytes of the GFP header and 516 bytes of the first superblock.

In systems and methods according to the present disclosure, control fields are included in each packet or, if used, in each superblock, to provide information on how each client is multiplexed into the packet. These control fields include occupation information used to identify which bytes of the packet or of the superblock do not contain valid client payload. The control field information allows each CBR client to be asynchronously multiplexed into the packet and demultiplexed from the packet.

In order to recover the frequency characteristics of the client, the control field information must be combined with a time base that is common to the source and destination nodes. For example, on an Ethernet network, this common time base can be distributed using PTP (Precision Timing Protocol as per IEEE 1588, which is discussed briefly above) or SyncE (as per ITU-T G.8262).

To combat the effects of dropped packets on the CBR client clock recovery, redundant occupation information for another packet is added to each packet. This information is placed in a redundant control field in each packet or in each superblock.

Because the CBR clients that are multiplexed into a packet have the same source and destination in the packet network, the TDM functions are only required at the end-points and, thus, no changes need to be made to the packet network. Also, because the multiplexing reduces the number of unique packet flows in the packet network, the traffic management and forwarding resources in the packet network will be less stressed.

The delay reduction mechanisms used by IEEE 802.3br, IEEE 802.1Qbu, and IEEE 802.1Qbv do not merge multiple CBR streams into one Ethernet flow. Instead, they try to reduce the packet multiplexing delay by limiting the maximum effective size of Ethernet frames, by allowing high priority traffic to interrupt low priority traffic, and by scheduling and reserving time in the Ethernet stream for specific classes of traffic. In the environment of a C-RAN fronthaul application, none of these mechanisms reduce the delay to the extent possible with the systems and methods of the present disclosure. Because the IEEE 802.3bv mechanism works with minimum quantized steps that are in units of packets, which have a minimum value of 64 bytes for Ethernet, its multiplexing delay is inherently larger by a significant amount. Also, it offers little benefit to a network that contains many express flows and few preemptable flows. The IEEE 802.1Qbu and IEEE 802.1Qbv mechanisms that interrupt low priority (preemptable) traffic and that schedule and reserve time slots in the Ethernet stream, respectively, are not effective when there are many flows of the same traffic class that require a low delay. The systems and methods disclosed herein could be directly used in a network that supports these IEEE mechanisms in an attempt to form an even better delay controlled network.

While systems and methods disclosed herein use the TDM byte stuffing mechanism of traditional telecom protocols, such as SONET/SDH and OTN, to accommodate asynchronicity between the client and the transport layer it is mapped into, the systems and methods disclosed herein differ from them in that the time division multiplexing/demultiplexing is performed into/from the payload area of a packet flow rather than the payload area of a CBR stream. Also, redundant information is included in the packet flow to combat the effects of dropped packets.

Examples of Time Division Multiplexing multiple CBR clients into a Packet

Figure 4:
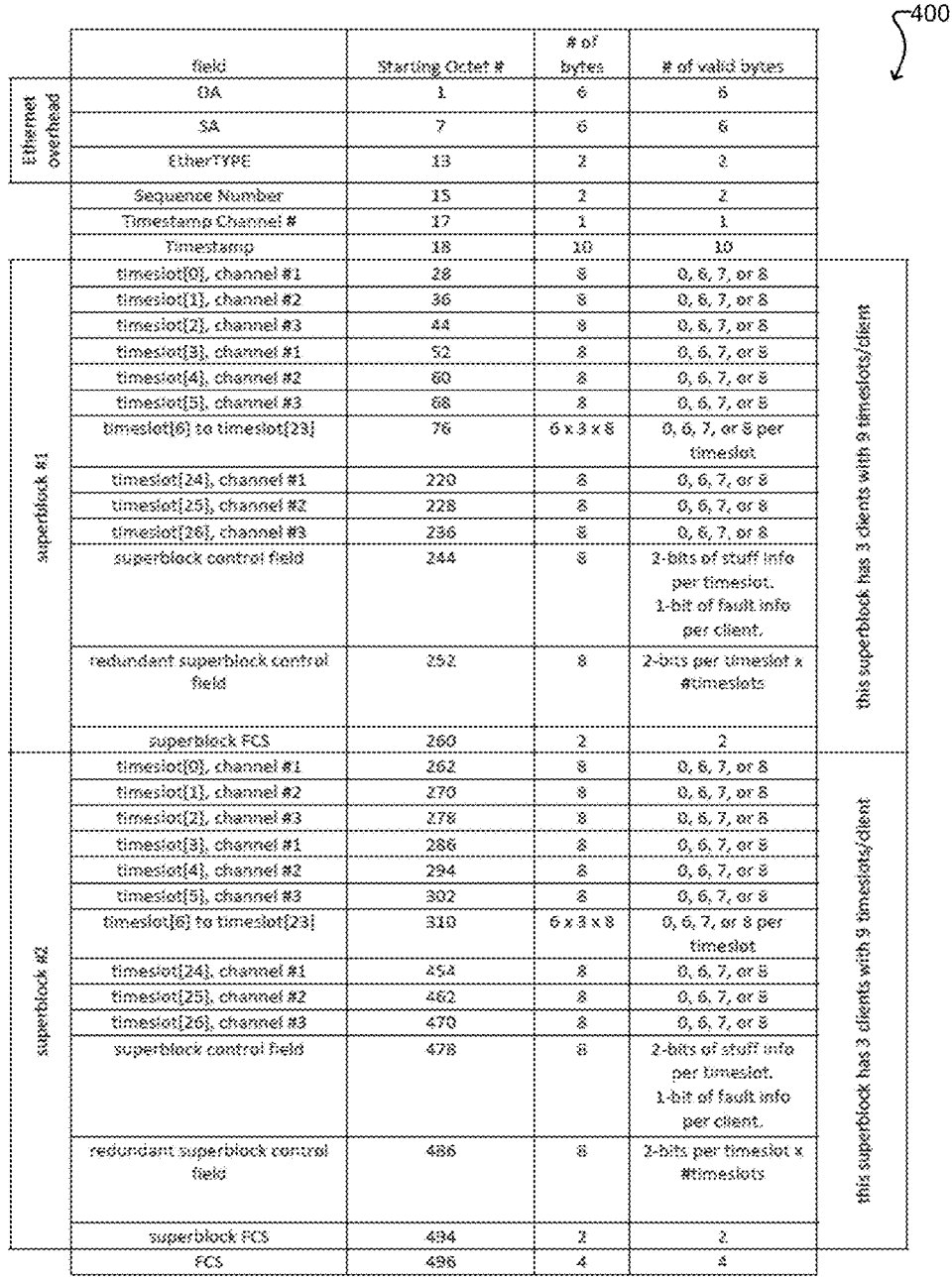
FIG. 4 shows an example generic Ethernet frame generated by a packetizer according to one embodiment of the present disclosure.

As noted above, the systems and methods disclosed herein reduce the delay incurred upon the transport of multiple CBR clients (also referred to as CBR data streams, or channels) over a packet network by time division multiplexing the CBR clients into one or more packet flows. As shown in FIGS. 4 and 4A, this is done by dividing a packet into multiple timeslots and assigning timeslots to individual clients. Control or "occupation" information is inserted into the packet flow to indicate whether or not each timeslot is filled with client data or with non-valid (i.e. "stuff") data. These stuff opportunities are used in the same manner as for traditional time division multiplexing systems, as described above. Positive and negative offsets from the expected frequency of the client are accommodated by adding extra bandwidth (for positive offsets) or removing allocated bandwidth (for negative offsets).

While the general mechanisms mentioned above are present in the packets, the allocation of timeslots and stuff opportunities are optimized for each application. This optimization depends on the rates of the CBR clients, the number of CBR clients, the packet sizes, and the payload capacity of the packet stream.

FIG. 4 shows a generic example of an Ethernet frame or packet 400 according to one embodiment that can service the multiplexing, asynchronous stuffing, frequency recovery, and residence time measurement functions. In the illustrated example, the packet 400 is used for combination of data from three CBR data streams (indicated as channel #1, channel #2, channel #3 in FIG. 4) into a single packet flow, but it is to be understood that any number of CBR data streams could be combined into a single packet flow. The numbers of CBR clients, timeslots and superlocks may be specified using any suitable network management mechanism.

The Ethernet overhead fields (DA, SA, EtherTYPE) of the packet 400 are as defined in IEEE 802.3. A new EtherTYPE value would need to be allocated for the new payload type disclosed herein. The remaining fields are discussed in the following paragraphs.

The Sequence Number field increments by one for each successive Ethernet frame of this packet flow. This number helps the destination node detect missing and out-of-order frames.

The Timestamp Channel # field shows which CBR client the value in the Timestamp field belongs to. In some embodiments, each packet in a packet flow has a timestamp from one of the CBR clients. In other embodiments, only some of the packets will have a timestamp, and others will have no timestamp, in which case the Timestamp Channel # field will indicate that no timestamp is present in that packet. In either case, within a sequence of packets of a predetermined length within a packet flow, a timestamp from each CBR client is included in at least one of the packets in the sequence.

The Timestamp field is the time that the corresponding byte of the CBR client (identified by the Timestamp Channel #) crossed at a specified reference plane. Timestamping is described further below with reference to FIG. 8. In some embodiments, the Timestamp field uses the same format as IEEE 1588v2's originTimestamp, which has 48-bits of integer seconds and 32-bits of nanoseconds. However, some or many of the most significant bits could be removed if it is not necessary to track a very long period of time. More bits could be added to accommodate fractional nanosecond timestamp resolution.

The example packet 400 of FIG. 4 includes two superblocks, each of which is divided into a plurality of timeslots. Each superblock also includes a control field and a redundant control field containing occupation information, and a frame check sequence (FCS) field used for error checking.

A timeslot is a unit of bandwidth in the packet stream that is allocated to a CBR client channel for multiplexing. In this example, a timeslot is made up of 8 consecutive bytes. Each channel takes a pre-assigned number of timeslots, which occur in a pre-defined manner (e.g. every n×8 bytes) in each Ethernet frame. Each timeslot can service the TDM stuffing mechanism—it can be unfilled, partially filled, or completely filled. In this example, each timeslots can contain 0, 6, 7, or 8 bytes of client data.

The control field of the each superblock includes occupation information indicating the fill level of each timeslot. In this example, there are 2 bits for each timeslot in the superblock and 27 timeslots per superblock. So, there are 54 bits of occupation information. Each of the 2 bits indicates whether the corresponding timeslot contains 0, 6, 7, or 8 bytes of valid client data.

Additional bits in the control field are allocated to indicate an alarm condition on each of the CBR clients. Usually, only one bit is necessary. In this example, there are 10 bits leftover after the stuff control information so 3 bits (one for each CBR client) could be allocated to indicate fault conditions on each of the incoming CBR clients.

The redundant control field of the superblock includes occupation information indicating the fill level of each timeslot of the corresponding superblock of the previous packet. This redundant timing information can be used to maintain frequency lock if the previous packet was dropped by the packet network.

The FCS field of each superblock contains a number calculated based on the data in the superblock. When the superblock is received at its destination, this number is recalculated and compared to the number in the FCS field to detect discrepancies. In the illustrated example, the packet 400 also includes an overall FCS field based on the data in the packet 400 as a whole.

FIG. 4A shows another example packet 400A according to another embodiment. The packet 400A is substantially similar to packet 400 of FIG. 4, except that packet 400A is not divided into superblocks. The fields of packet 400A are otherwise the same as the corresponding fields in packet 400, and will not be described again.

Packetization and Multiplexing Delay Reduction

Figure 5:
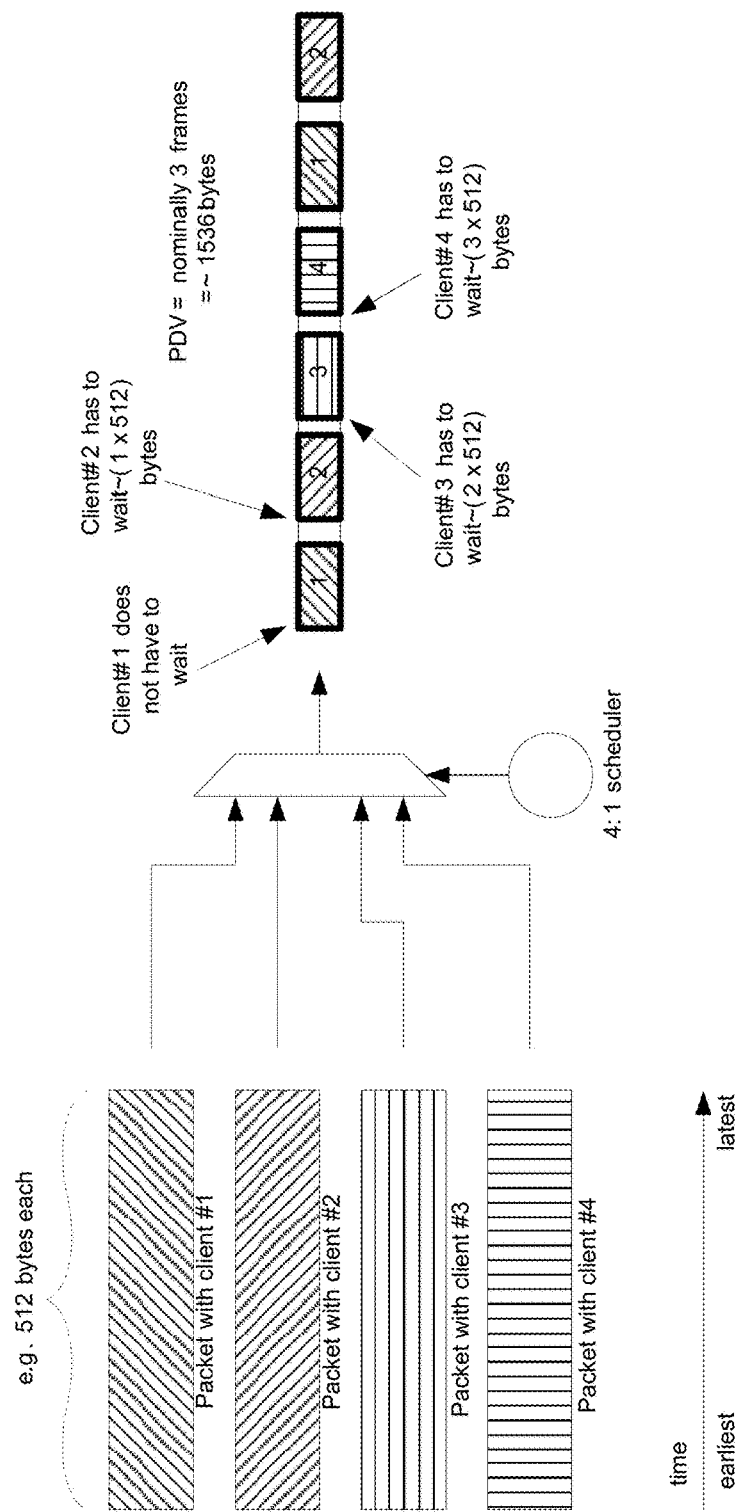
FIG. 5 illustrates delay for an example of traditional multiplexing of four CBR data streams at the packet level, wherein each CBR data stream is packetized into its own packet flow before the packet flows are multiplexed into a packet stream.
Figure 6:
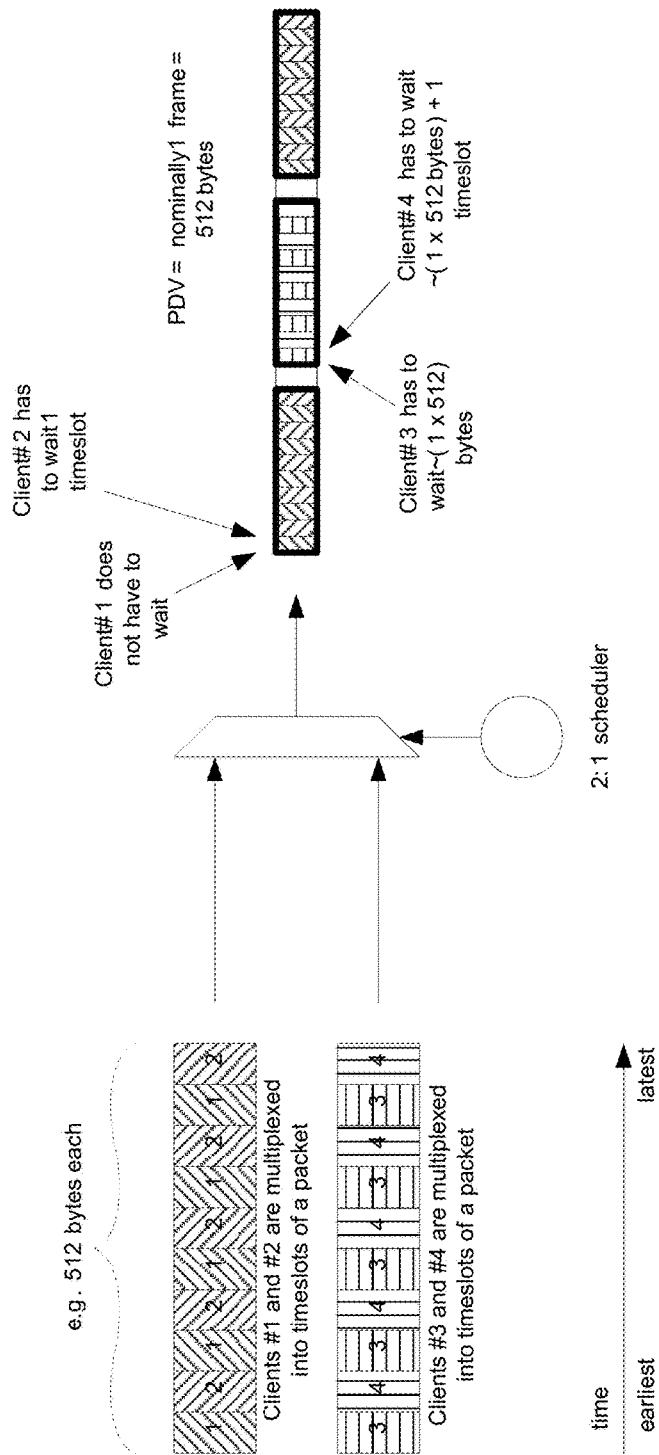
FIG. 6 illustrates delay for an example of multiplexing of four CBR data streams according to one embodiment of the present disclosure, wherein two CBR data streams are packetized into each of two packet flows.
Figure 7:
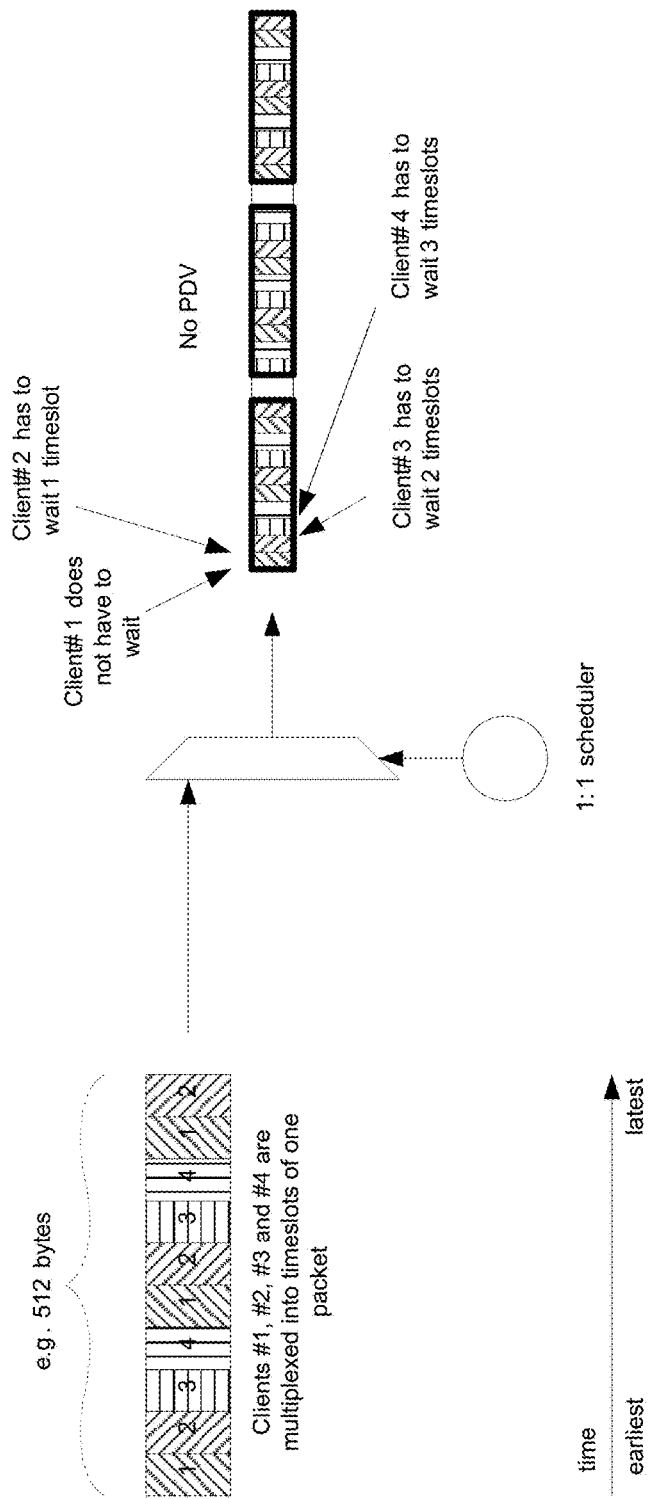
FIG. 7 illustrates delay for an example of multiplexing of four CBR data streams according to one embodiment of the present disclosure, wherein all four CBR data streams are packetized into a single packet flow.

The delay reduction that is an inherent property of time division multiplexing multiple CBR clients into one packet flow according to the systems and methods disclosed herein is illustrated by the examples in FIG. 5, FIG. 6, and FIG. 7. In each example, four CBR data streams (clients #1, #2, #3, #4) are to be transported over a packet network. To simplify these examples, the following assumptions are used:

The overhead bytes that are associated with each packet are ignored and assumed to be insignificant. However, it should be recognized that the inclusion of overhead bytes would strengthen the performance benefits of this invention as it increases the time span of each packet.

Each packet is assumed to be 512 bytes in size. Larger packet sizes would strengthen the performance benefits of this invention because of the increased time span of each packet and the increased potential for mapping more clients into each packet.

A TDM timeslot consists of 8 consecutive bytes in the packet.

The CBR clients are of the same nominal rate, but are not necessarily synchronous.

The common packet stream to which the CBR clients are multiplexed into has sufficient bandwidth to carry all the traffic without congestion.

In FIG. 5, traditional multiplexing at the packet level is used. The CBR clients are packetized individually into their own 512 byte packets before each of their packets are multiplexed into the common packet stream by the 4:1 scheduler. The components of delay in this example are as follows:

The time taken to create each packet is 512 byte times of the client.

The minimum time taken to multiplex each client into the common packet stream varies between clients. Client #1 does not have to wait to be multiplexed into the common packet stream. Client #2 must wait for client #1's packet to be multiplexed. This wait-time is approximately 512 byte times of the common packet stream. Client #3 must wait for both client #1's and client #2's packets to be multiplexed. This wait-time is approximately 2×512 =1024 byte times of the common packet stream. Client #4 must wait for client #1's, client #2's, and client #3's packets to be multiplexed. This wait-time is approximately 3 ×512=1536 byte times of the common packet stream.

The possible delay variation in the FIG. 5 example depends on whether there is another packet being transmitted at the time the client data arrives. If the clients are asynchronous to each other and to the common packet stream, then the ordering of their multiplexing could vary with the times that each client's packets are fully formed. With a fair scheduler and asynchronous clients, the packet multiplexing delay variation could range between a wait-time of 0 to a wait-time of 1536 bytes.

In FIG. 6, a combination of TDM according to the systems and methods disclosed herein and traditional packet multiplexing is shown. This mixed-use example represents a likely practical implementation of the systems and methods disclosed herein. Two CBR clients are time division multiplexed into each 512 byte packet before the resulting packets are multiplexed into the common packet stream by the 2:1 scheduler. The components of delay in this example are as follows:

The time taken to create each packet is 256 byte times of each client. To distribute the delay evenly, the clients' bytes are interleaved throughout the packet.

The minimum time taken to multiplex each client into the common packet stream varies between clients. Client #1 does not have to wait to be multiplexed into the common packet stream. Client #2 must wait 1 timeslot (8 bytes) of the common packet stream. Client #3 must wait for the packet containing client #1 and client #2 to be multiplexed. This wait-time is approximately 512 byte times of the common packet stream. Client #4 must wait for the packet containing client #1 and client #2 to be multiplexed and the timeslot (8 bytes) containing client #3 in its own packet. This wait-time is approximately 512+8=520 bytes of the common packet stream.

The possible delay variation in the FIG. 6 example depends on when the client data arrives relative to when its timeslot is available and whether there is another packet being transmitted at this time. If the two packet flows are asynchronous to each other, then the ordering of their multiplexing could vary with the times that each client's packets are fully formed. With a fair scheduler, the packet multiplexing delay variation could range between a wait-time of 0 to 1 packets, which is a variation of 512 bytes of the common packet stream. If the client is asynchronous to the packetization function, its arrival may occur at the moment its timeslot is just made available or at the moment when its timeslot has just passed. In the former case, there is no wait time. In the latter case, the wait time would depend on how the timeslots are allocated. In a simple case where all the clients have an equal number of timeslots, the wait time would be equal to the timeslot time multiplied by the (number of clients to be multiplexed into the packet flow minus 1). For this example, the delay is one extra timeslot time of the common packet stream clock.

In FIG. 7, traditional packet multiplexing is eliminated and all client multiplexing is done during the packetization step. As such, this example shows an optimum use case of the systems and methods disclosed herein. All four CBR clients are time division multiplexed into 512 byte packets. The components of delay in this example are as follows:

The time taken to create each packet is 128 byte times of each client. To distribute the delay evenly, the clients' bytes are interleaved throughout the packet.

Because there is only one packet flow, there is no packet multiplexing delay. The only delay is the time division multiplexing delay. Client #1 does not have to wait to be time division multiplexed into the packet. Client #2 must wait for client #1 to be time division multiplexed into the packet. This wait-time is 1 timeslot (8 byte times in this example) of the common packet stream. Client #3 must wait for client #1 and client #2 to be time division multiplexed into the packet. This wait-time is 2 timeslots (16 byte times of the common packet stream). Client #4 must wait for client #1, client #2, and client #3 to first be time division multiplexed into the packet. This wait-time is 3 timeslosts (24 byte times of the common packet stream).

The possible delay variation in the FIG. 7 example depends on when the client data arrives relative to when its timeslot is available and whether there is another packet being transmitted at this time. Since there is only one packet flow in this example, there is no packet delay variance. If the client is asynchronous to the packetization function, its arrival may occur at the moment its timeslot is just made available or at the moment when its timeslot has just passed. In the former case, there is no wait time. In the latter case, the wait time would depend on how the timeslots are allocated. In a simple case where all the clients have an equal number of timeslots, the wait time would be equal to the timeslot time multiplied by the (number of clients to be multiplexed into the packet flow minus 1). For this example, the delay is an extra 3 timeslot times of the common packet stream clock.

The worst-case delay and the potential delay variations of the three examples of FIGS. 5 to 7 with 4 CBR clients are summarized in Table 1. The delay reduction and delay variations are reduced dramatically for this example with only 4 CBR clients. As the number of CBR clients grows, the benefits also grow.

TABLE 1

Comparisons of Worst-Case Delay and Delay Variation:

| Example | Worst-Case Delay (in units of common packet stream byte times) | Potential Delay Variation (in units of common packet stream byte times) |
| --- | --- | --- |
| FIG. 5 (4 packet flows) | (512 × 4) + 1536 + 0 = 3584 | 512 + 512 + 512 = 1536 |
| FIG. 6 (2 packet flows) | (256 × 4) + 512 + (8 × 1) = 1544 | 512 + (8 × 1) = 520 |
| FIG. 7 (1 packet flow) | (128 × 4) + 0 + (8 × 3) = 536 | 8 × 3 = 24 |

Since 4 CBR clients are being multiplexed into one common packet stream in these examples, an assumption is made that the client clock period is 4 times as large as the common packet stream's clock period. A timeslot format of 8 consecutive bytes is assumed in these examples.

As can be seen from Table 1 above, the delay reduction benefit grows with the number of clients that are time division multiplexed into each packet flow. These delays can be calculated using the following variables and formulas:

Variables:
NUM_CBR_CLIENTS=total number of CBR clients;
NUM_CLIENTS_PER_FLOW=number of CBR clients that are time division multiplexed into each packet flow;
PKT_SIZE=size of each packet;
Tclient_BYTE_TIME=the time span of one byte of data of the client;
Tpkt_BYTE_TIME=the time span of one byte of data in the common packet stream;
Tpkt_SLOT_TIME=the time span of one timeslot of one client in the common packet stream;
PKT_FORM_DLY=the time required to form one packet;
PKT_MUX_DLY=the worst-case wait-time for a packet to be multiplexed into the common packet stream;
TDM_MUX_DLY=the worst-case wait-time for a client to be time division multiplexed into a packet;

TOTAL_MAX_DLY=the maximum wait-time for a client that is multiplexed into the common packet flow;

systems and methods disclosed herein are used to less than full extent, are shown in other rows of Table 2.

TABLE 2

Delay and Delay Variation Results for CPRI option 1 into a 10GE stream:

| NUM_CBR_CLIENTS | NUM_CLIENTS_PER_FLOW | PKT_SIZE (bytes) | Tclient_BYTE_TIME (ns) | Tpkt_BYTE_TIME (ns) |
|---|---|---|---|---|
| 16 | 1 | 512 | 13 | 0.8 |
| 16 | 2 | 512 | 13 | 0.8 |
| 16 | 4 | 512 | 13 | 0.8 |
| 16 | 8 | 512 | 13 | 0.8 |
| 16 | 16 | 512 | 13 | 0.8 |

| Tpkt_TSLOT_TIME (ns) | NUM_CBR_CLIENTS | NUM_CLIENTS_PER_FLOW | PKT_FORM_DLY (ns) | PKT_MUX_DLY (ns) |
|---|---|---|---|---|
| N/A | 16 | 1 | 6656 | 6144 |
| 6.4 | 16 | 2 | 3328 | 2867.2 |
| 6.4 | 16 | 4 | 1664 | 1228.8 |
| 6.4 | 16 | 8 | 832 | 409.6 |
| 6.4 | 16 | 16 | 416 | 0 |

| TDM_MUX_DLY (ns) | NUM_CBR_CLIENTS | NUM_CLIENTS_PER_FLOW | TOTAL_MAX_DLY (ns) | MAX_DLY_VAR (ns) |
|---|---|---|---|---|
| 0 | 16 | 1 | 12800 | 6144 |
| 6.4 | 16 | 2 | 6201.6 | 2872.3 |
| 19.2 | 16 | 4 | 2912 | 1244.2 |
| 44.8 | 16 | 8 | 1286.4 | 445.44 |
| 96 | 16 | 16 | 512 | 76.8 |

MAX_DLY_VAR=the maximum variation in the wait-time for a client that is multiplexed into the common packet flow.

Formulas:

PKT_FORM_DLY=PKT_SIZE/NUM_CLIENTS_PER_FLOW*Tclient_BYTE_TIME

PKT_MUX_DLY=Tpkt_BYTE_TIME*PKT_SIZE*(NUM_CBR_CLIENTS/NUM_CIENTS_PER_FLOW−1)

TDM_MUX_DLY=Tpkt_SLOT_TIME*(NUM_CLIENTS_PER_FLOW−1)

TOTAL_MAX_DLY+PKT_MUX_DLY+TDM_MUX_DLY

MAX_DLY_VAR=Tpkt_BYTE_TIME*(PKT_SIZE*(NUM_CBR_CLIENTS/NUM_CLIENTS_PER_FLOW−1)+Tpkt_TSLOT_TIME*(NUM_CLIENTS_PER_FLOW−1))

The above formulas are used to illustrate the dramatic benefits of the systems and methods disclosed herein in an example with more CBR clients. The results shown in Table 2 are for an example which uses a 10 Gigabit Ethernet (10 GE) for the common packet stream, 16 CPRI option 1 (614.4 Mbit/s) streams for the CBR clients, and 512 byte packets. Once again, the effects of the packets' overhead bytes are not accounted for.

When systems and methods according to the present disclosure are not used, the TOTAL_MAX_DLY for this example is 12800 ns and the MAX_DLY_VAR is 6144 ns (see the first row of results in Table 2). When the systems and methods disclosed herein are used to their full extent, with all 16 CBR clients TDMed into a single packet flow, the TOTAL_MAX_DLY is 512 ns and the MAX_DLY_VAR is 76.8 ns (see the last row of results in Table 2). Even when the systems and methods disclosed herein are used, but only to a minimum extent (2 clients per packet flow), the delay and delay variance is reduced by a factor of greater than 2 (see the 2nd row of results in Table 2). Other cases where the systems and methods disclosed herein are used to less than full extent, are shown in other rows of Table 2.

Benefits to the Packet Switching Network

In a packet switching network, packets from different origin points may be multiplexed onto a common egress port of a node in the network. As more packet flows are multiplexed together at an egress port, the delay and delay variation of any individual flow on this port will grow.

Because the systems and methods disclosed herein reduce the number of independent packet flows that go to the intermediate packet switching network, they can reduce the packet delay and packet delay variation in the intermediate network. The principles of packet multiplexing delay reduction discussed above also apply to the intermediate packet switching network. If systems and methods disclosed herein were used at every entry port to the packet switching network, the number of flows would be reduced at every packet generation source. Then, because a packet flow usually hops through many nodes before reaching its destination and because the multiplexing delay reduction occurs at every node, the delay reduction benefit would grow linearly with every hop that the packet flow traverses.

A reduction in the number of independent flows will also cause fewer of the packet switching network's resources for traffic management and storing forwarding rules to be used. This could bring about a reduction in the performance requirements of the equipment and bring cost and power benefits to the network.

The aforementioned benefits to the intermediate packet switching network can be realized without offering any new functions. It benefits from the reduction in the number of independent packet flows. Only the originating port that packetizes the CBR clients and the termination port that recovers the CBR clients need to implement the systems and methods disclosed herein.

Depacketization Delay Reduction

To allow for an easier description and specific examples to be used, this section uses Ethernet as the packet transport protocol. However, the principles still apply for other packet transport protocols.

Use of the superblock mechanism described in this section is not required in all embodiments, but may be beneficial in some use cases.

A normal Ethernet frame must be fully received and its FCS checked before it can be declared to be free of errors and the payload can be depacketized. For large Ethernet frame sizes, this delays the start of processing of the Ethernet payload. To reduce this delay, smaller Ethernet frames can be used. However, small Ethernet frames are inefficient because the Ethernet header and FCS fields become a larger percentage of the entire Ethernet frame.

The superblock mechanism used for GFP frames, as described above, can make the depacketization delay independent from the overall size of the Ethernet frame.

This allows for both the efficiency and the processing delay to be optimized. The superblock used by the systems and methods disclosed herein does not involve any transcoding like it does in ITU-T G.709/Y1.333 and ITU-T G.7041.

The Ethernet frame format shown and described above with reference to FIG. 4 contains two superblocks. Because each superblock has its own FCS and control fields, error checking can be performed and the stuff bytes for each client can be found within a superblock. Thus, the processing of the client payload can begin once a superblock has been received. The depacketization delay is reduced from 499 bytes (the full size of the Ethernet frame) to 261 bytes (the size of the Ethernet frame up to the end of the first superblock).

If efficiency of the Ethernet frame is defined to be the number of required data fields (assuming timeslots all contain valid data) in the Ethernet frame divided by the total number of bytes of the Ethernet frame, we can compare the efficiency of an Ethernet frame with two superblocks to that of an Ethernet frame with a similar processing delay but without any superblocks. To remain consistent with the frame format shown in FIG. 4, it is assumed that there are 3 clients per frame and a timeslot size of 8 bytes is used.

Efficiency Calculation for a frame with 2 superblocks:
Required Data Fields:
Client bytes=2 superblocks×(3 clients×9 timeslots/client×8 bytes/timeslot)/superblock=432 bytes;
Sequence Number+Timestamp Channel #+Timestamp=13 bytes;
Control Field=2 superblocks×8 bytes/superblock=16 bytes;
Redundant Control Field=2 superblocks×8 bytes/superblock=16 bytes;
Total=432+13+16+16=477 bytes.
Overhead:
Ethernet overhead=DA+SA+EtherType+FCS=6+6+2+4=18 bytes;
Superblock overhead=2×superblock FCS=4 bytes.
Total bytes in Ethernet frame=499.
Efficiency=477/499=95.59%

Efficiency Calculation for a frame with similar delay and without superblocks:
Required Data Fields:
Client bytes=3 clients×9 timeslots/client×8 bytes/timeslot=216 bytes;
Sequence Number+Timestamp Channel #+Timestamp=13 bytes;
Control Field=8 bytes;
Redundant Control Field=8 bytes;
Total=216+13+8+8=245 bytes.
Overhead:
DA+SA+EtherType+FCS=6+6+2+4=18 bytes.
Efficiency=245/(245+18)=93.16%.

Keeping the parameters of 3 clients per frame and a timeslot size of 8 bytes from FIG. 4, the relationships between the packet efficiencies and the depacketization delay (as determined by the number of Timeslots per Client per Frame) are shown in Table 3 for no superblocks, 2, 3, and 4 superblocks per frame. The superblock mechanism keeps the depacketization delay small while improving the packet efficiency significantly, especially for the small depacketization delay values.

TABLE 3

Ethernet Efficiencies with Superblocks:

| # of Clients per Frame | Timeslot Size (bytes) | # of Timeslots per Client per Frame | # of Superblocks per Frame | # of Required Data Bytes per Frame | # of Overhead Bytes per Frame | Ethernet Frame Size (bytes) | Processing Delay (bytes) | Efficiency (%) |
|---|---|---|---|---|---|---|---|---|
| 3 | 8 | 3 | none | 101 | 18 | 119 | 119 | 84.87% |
| 3 | 8 | 3 | 2 | 189 | 22 | 211 | 110 | 89.57% |
| 3 | 8 | 3 | 3 | 277 | 24 | 301 | 110 | 92.03% |
| 3 | 8 | 3 | 4 | 365 | 26 | 391 | 110 | 93.35% |
| 3 | 8 | 6 | none | 173 | 18 | 191 | 191 | 90.58% |
| 3 | 8 | 6 | 2 | 333 | 22 | 355 | 191 | 93.80% |
| 3 | 8 | 6 | 3 | 493 | 24 | 517 | 191 | 95.36% |
| 3 | 8 | 6 | 4 | 653 | 26 | 679 | 191 | 96.17% |
| 3 | 8 | 9 | none | 245 | 18 | 263 | 263 | 93.16% |
| 3 | 8 | 9 | 2 | 477 | 22 | 499 | 272 | 95.59% |
| 3 | 8 | 9 | 3 | 709 | 24 | 733 | 272 | 96.73% |
| 3 | 8 | 9 | 4 | 941 | 26 | 967 | 272 | 97.31% |
| 3 | 8 | 12 | none | 317 | 18 | 335 | 335 | 94.63% |
| 3 | 8 | 12 | 2 | 621 | 22 | 643 | 353 | 96.58% |
| 3 | 8 | 12 | 3 | 925 | 24 | 949 | 353 | 97.47% |
| 3 | 8 | 12 | 4 | 1229 | 26 | 1255 | 353 | 97.93% |

It should be noted that, despite the increased efficiency and even with a reduced depacketization delay from the use of the superblock mechanism, very large Ethernet frames may not be desired because they have a large packet generation delay and may negatively affect the packet multiplexing delay of other Ethernet flows. A balance between all these factors must be found to determine the best packet size to use for any application.

Client Frequency Recovery at Destination

To record and to recover the frequency of the CBR client at the destination, a differential timing mechanism can be used. Timestamps are used at packetization to record a time to start a measurement and a time to end a measurement. During this measurement period, the number of bytes of the client that occurred is counted. With this information, it is possible to calculate the difference in frequency between the client and the clock that runs the timestamp counter. If the clock that runs the timestamp counter is available at depacketization, then the original frequency of the client can be recovered there using this differential relationship.

The timestamping clock used at packetization could be distributed to the depacketizing function, for example, using a physical clock of the common packet stream (e.g. the Synchronous Ethernet clock, as described in ITU-T g.8262/Y.1362), or through the use of timestamps (e.g. as described in IEEE 1588v2).

Figure 8:
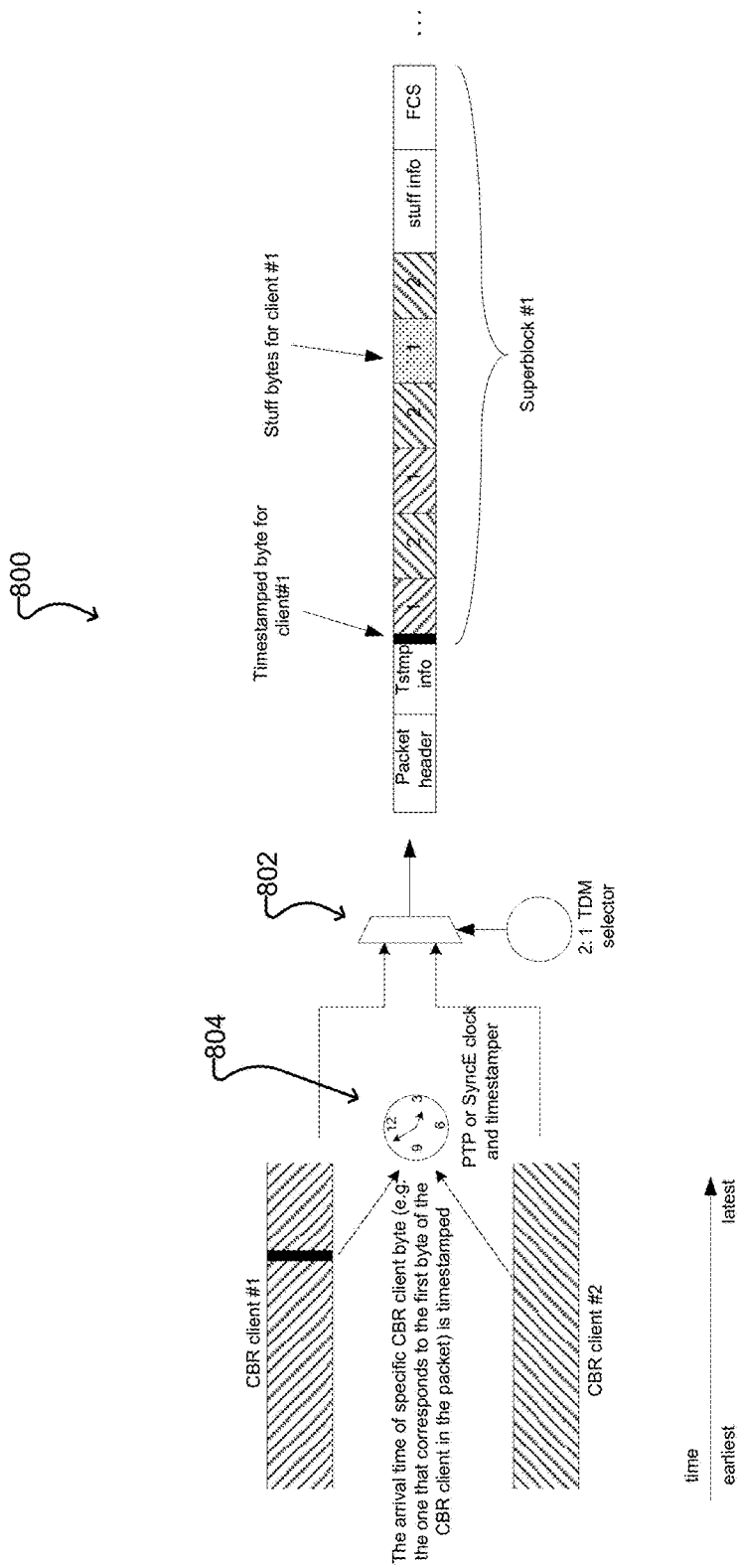
FIG. 8 illustrates timestamping of a packet according to one embodiment of the present disclosure.

FIG. 8 shows an example timestamping system 800 for use at packetization according to one embodiment. In the illustrated example, two CBR clients are combined into a single packet flow by a 2:1 TDM selector 802, and a timestamper 804 adds timestamping information into the resulting packet.

At packetization, the timestamp for when a particular byte of the CBR client crosses a reference plane is recorded. For example, in the example timestamping system 800 of FIG. 8, the timestamp corresponds to the first byte (highlighted with solid black in FIG. 8) of the particular client in the packet. This timestamp is then placed into the Timestamp field of the packet and the corresponding CBR client's channel number is placed into the Timestamp Channel # field (see FIG. 4). In some embodiments, every packet will have a timestamp, and in other embodiments only some of the packets will have a timestamp, as discussed above. In either case, all of the CBR clients that are multiplexed into the packet flow will each have regular opportunities to put its timestamp into a packet.

In the example Ethernet frame format shown in FIG. 4, the Timestamp field uses the same format as IEEE 1588's originTimestamp, which has 48-bits of integer seconds and 32-bits of nanoseconds. Some, perhaps many, of the most significant bits could be removed from this field if it is determined that it is not necessary to track the time for this long. In most cases, a timestamp that covers just several thousand seconds will be more than sufficient to cover the transport time and keep the digital jitter and wander filtering algorithms simple. Also, when it becomes possible to achieve such accuracy, more bits could be added in the least significant bit locations to accommodate fractional nanoseconds in the timestamp.

At depacketization, the number of bytes of a CBR client that occurred between two timestamps corresponding to that CBR client can be detected and counted using the information in the control fields of the packets.

For any CBR client, using two timestamps (from two disperse packets) from packetization and two timestamps from depacketization, the counted number of client bytes that occurred between these timestamps, and a common timestamping clock, the clock of the CBR client can be recovered using common differential timing recovery methods.

Frequency Recovery with Dropped Packets

If a packet is dropped during transport across the packet network, the segment of each CBR client that is contained in the packet will be lost. The missing packets can be detected at the destination by looking at the Sequence Number field (see FIG. 4) in the packets.

Because of the asynchronous mapping mechanism used in the systems and methods disclosed herein, the loss of one packet results in the loss of an unknown number of bytes for each CBR client in the packet. Erroneous insertion or deletion of bytes on a recovered CBR client stream could cause a momentary frequency offset and a loss-of-frame event on the downstream CBR equipment. This is a more serious and a longer lasting error condition than a few bit errors.

The redundant superblock control field, as shown in FIG. 4, offers protection against this condition. This redundant superblock control field of a packet gives the occupation information for the corresponding superblock of the previous packet. So, if a packet is lost, the frequency information for its CBR clients can be found in the next packet.

There is no redundancy for the data that was contained in the lost packet, but pre-defined replacement data patterns can be used as a substitute. These replacement patterns may be specific for each client type to best fit with its required protocol characteristics.

Because the redundant frequency information is given only on the successive packet, this mechanism does not protect against the dropping of two consecutive packets. Fortunately, given the very low bit error rates of modern networks, the probability of this happening randomly is much lower. This type of problem is indicative of a more serious network issue (e.g. congestion) which must be resolved using other methods.

Client Residence Time Measurement

The residence time of the CBR client in the packet network can be used by a baseband unit in a C-RAN to determine the time when CBR client data was sourced by the radio (towards the baseband unit) and the time it will arrive at the radio (from the baseband unit). Knowledge of this delay eliminates the need for the packet network to have a symmetrical delay in the upstream (to the baseband unit) and the downstream (to the radio) directions.

In some embodiments, IEEE 1588v2 is used to distribute a common time-of-day between the packetizing node and the depacketizing node. As mentioned above, the timestamps may also be based on IEEE 1588v2 derived time.

As mentioned above with reference to FIG. 8, timestamping at packetization records when a particular CBR client byte crossed a reference point at that node and entered the packet domain. Another timestamp needs to be defined at depacketization to record when the same CBR client byte leaves the packet domain and re-enters the CBR domain. One option for this reference plane crossing event is when the same byte (highlighted with solid black in FIG. 8) is demultiplexed from the packet and put back into the domain of the recovered CBR client's clock.

The difference between the two timestamps is the residence time of the CBR client byte in the packet network. Because the timestamps were taken on the ingress CBR stream at packetization and on the recovered egress CBR stream at depacketization, and because the CBR clock is expected to be of an almost perfect constant frequency, the residence time of every client byte in the packet network must be equal to that of the highlighted byte.

Example Packetizer

Figure 9:
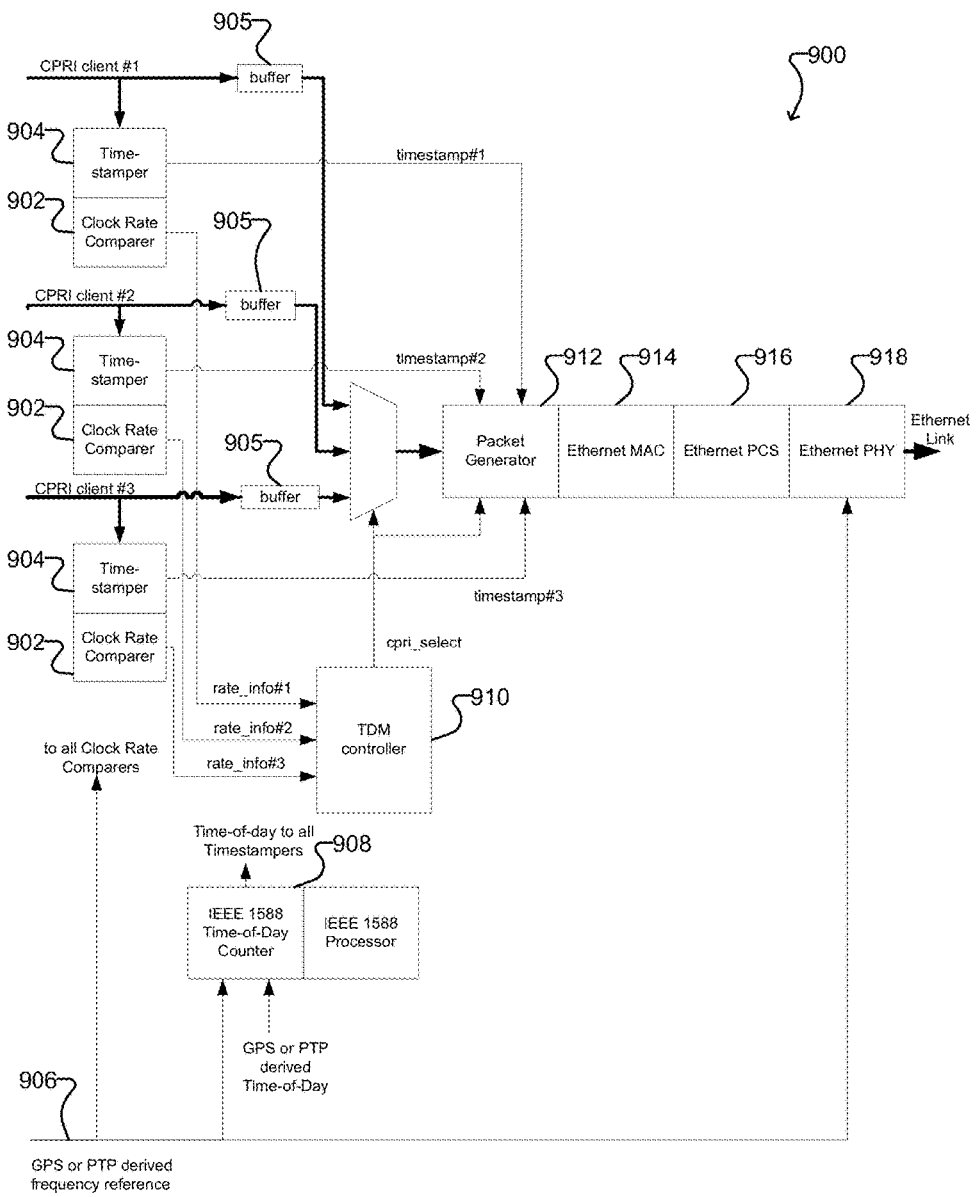
FIG. 9 shows an example packetizer according to one embodiment of the present disclosure.

FIG. 9 shows an example packetizer 900 according to one embodiment, which includes the TDM, SyncE, and IEEE 1588 timestamping functions. In this embodiment, the CBR clients are CPRI streams and the packet transport is done with Ethernet, and three CPRI clients (#1, #2, #3) are multiplexed into one Ethernet packet flow. Each of the CPRI clients has a clock rate comparer 902, timestamper 904 and buffer 905 associated therewith.

A GPS or IEEE 1588 (PTP) derived clock 906 is provided as frequency reference for a local IEEE 1588 time-of-day counter 908 and, optionally, the Ethernet physical layer (PHY) 918. The local IEEE 1588 time-of-day counter 908 also receives a GPS or a PTP derived time-of-day as a reference. How this timing information is made available to the packetizer 900 is not shown in FIG. 9 as it could be made available by any suitable mechanism.

When each byte of the CPRI client passes a pre-defined reference point (e.g. when it arrives at the Packetizer 900), it is timestamped by timestamper 904. The timestamp that corresponds to the first byte of the CPRI client in the first superblock is provided to a packet generator 912. The packet generator 912 receives the CPRI clients through their respective buffers 905 and creates packets (e.g. Ethernet frames) as described further below. In embodiments that use superblocks the packet generator 912 also creates the superblocks within each packet. The packet generator 912 periodically places received timestamps into the Timestamp field of an Ethernet frame. This is done periodically for each CPRI client. For example, the channel for the timestamp could be selected in a weighted round-robin manner, with the weights based on the relative nominal frequencies of the clients. CPRI clients of a faster rate would get proportionally more timestamps than clients of a slower rate. The client number that the timestamp belongs to is placed in the Timestamp Channel # field of the Ethernet frame.

The Clock Rate Comparer 902 compares the incoming CPRI client rate against the expected nominal CPRI rate, relative to the reference clock 906. This comparison information is provided to a TDM controller 910, which knows the nominal multiplexing order and selects which CPRI client is to be multiplexed into the superblock, determines how and when stuff bytes are used for each CPRI client.

The Packet Generator 912 starts creating an Ethernet frame by generating the appropriate Ethernet Header fields, Sequence #, Timestamp Channel #, and Timestamp information. For embodiments that use superblocks, for each superblock, the packet generator 912 then accepts the client payload and multiplexing information from the TDM controller 910 and appends the superblock control field information, the redundant superblock control field information, and the superblock FCS. The resulting datastream is passed to the Ethernet media access controller (MAC) 914, which then calculates and adds the Ethernet FCS to form the Ethernet frame. The Ethernet frames are then encoded by the Ethernet PCS 916 to form the Ethernet stream. The Ethernet stream is then put onto the appropriate medium by the transmit Ethernet PHY 918.

Example Depacketizer

Figure 10:
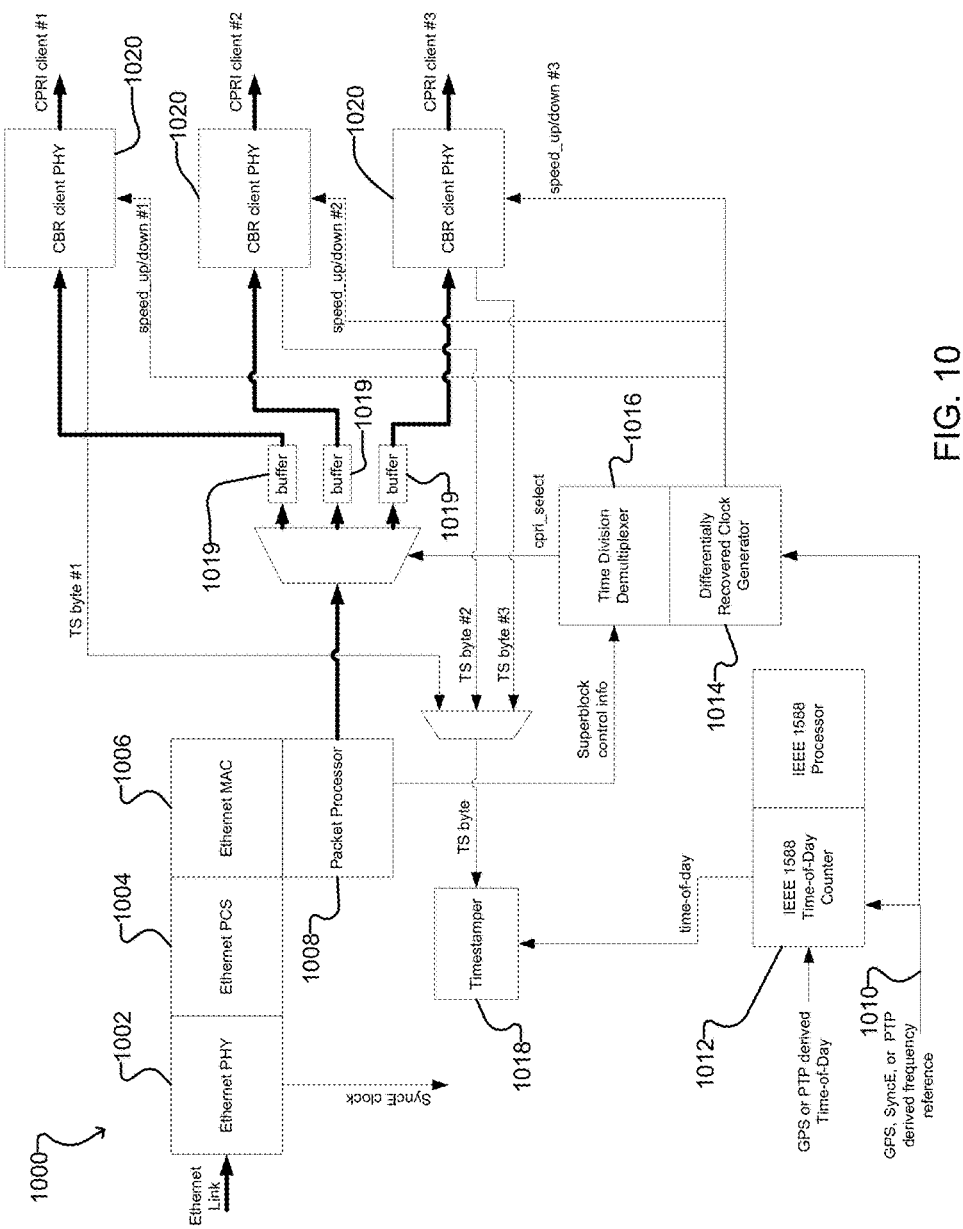
FIG. 10 shows an example depacketizer according to one embodiment of the present disclosure.

FIG. 10 shows an example depacketizer 1000 according to one embodiment, which includes the TDM, SyncE, and IEEE 1588 timestamping functions. In this embodiment, the CBR clients are CPRI streams and the packet transport is done with Ethernet, and three CPRI clients are demultiplexed from one Ethernet flow.

The receive Ethernet PHY 1002 takes the signal from the physical medium and recovers a clock and the digital bits of the Ethernet stream. The Ethernet PCS 1004 undoes the line-coding and recovers the Ethernet frame boundaries. The Ethernet MAC 1006 reads the Ethernet Header fields of each frame and extracts the other data from the frame for processing by a packet processor 1008.

An IEEE 1588 (from some PTP Master) or SyncE (from the receive Ethernet PHY) derived clock is provided as a frequency reference 1010 for a local IEEE 1588 time-of-day counter 1012 and a Differentially Recovered Clock Generator 1014. The local IEEE 1588 time-of-day counter 1012 also receives a GPS or PTP derived time-of-day as a reference. How this GPS or PTP information is made available to the depacketizer 1000 is not shown in FIG. 10 as it could be made available by any suitable mechanism.

With the Ethernet frame boundaries located, in embodiments that use superblocks, the packet processor 1008 can find the superblocks in the Ethernet frame.

After receiving an entire superblock and checking its FCS to ensure it is error free, the processor 1008 finds all the valid bytes for each of the clients in the superblock by using the information in the superblock's control field. The packet processor 1008 also performs any packet reordering required due to packets being received out of order (e.g., packets in a sequence may take different paths through the packet network and arrive at the depacketizer 1000 in a different order than they were sent), and checks the sequence numbers of received packets to determine any discontinuities. If any discontinuity in sequence numbers is detected the processor 1008 determines that a packet is missing, and that missing packet's client timing is recovered based on the redundant timeslot occupation information of the received packet with the sequence number immediately following the missing sequence number. The packet processor 1008 also checks the Ethernet FCS after all of the superblocks are processed.

The packet processor 1008 provides the control data from each received packet (or superblock) to a time division demultiplexer 1016, which extracts segments of CPRI client data from the timeslots of the packet and provides the CPRI data to a respective CBR physical layer (PHY) 1020 through an associated buffer 1019.

Periodically, a timestamp for each client arrives in the Ethernet frame. In the time between two timestamps for a given CPRI client, the number of valid bytes of that client can be counted. With this information, the clock frequency of the client relative to the timestamps is determined by the differentially recovered clock generator 1014. As mentioned earlier, the depacketizer 1000 already has the clock associated with the timestamps. This information is used by the differentially recovered clock generator 1014 to recover the frequency of each CPRI client and provide the frequency to the respective CBR client PHY 1020. With the frequency of each CPRI client recovered, it can then be retransmitted towards its destination.

As the CBR client's stream is recreated, the appearance of the "highlighted" or "timestamped" byte is detected and this event is timestamped at a timestamper 1018 of the depacketizer. How the timestamped byte is detected may vary depending on implementation details. For example, in one embodiment, the timestamped byte is detected by the packet processor 1008, which sends a marking signal along with the recovered CPRI payload to the respective CBR client PHY 1020, which in turn sends a respective signal to the timestamper 1018, as indicated by the "TS byte" signals in FIG. 10. The residence time of this timestamped byte in the packet network can be calculated by subtracting the timestamp in the Ethernet Frame from the depacketizer's corresponding timestamp for the timestamped byte. This residence time information may be output by the timestamper 1018 to a baseband unit of a fronthaul system for calculating latency asymmetry as discussed below.

Example Fronthaul System

Figure 11:
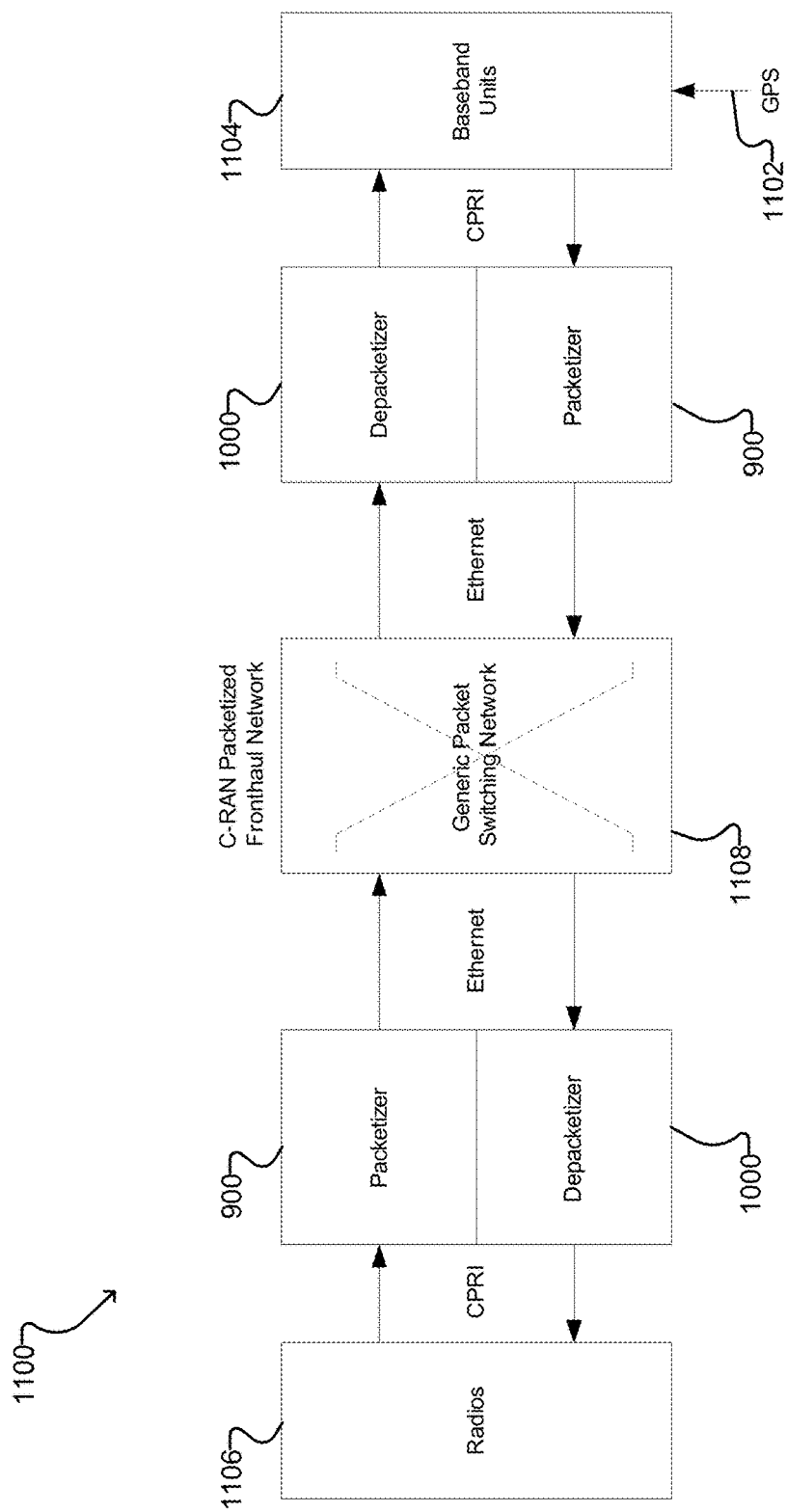
FIG. 11 shows an example fronthaul system according to one embodiment of the present disclosure.

FIG. 11 shows an example Fronthaul system 1100 according to one embodiment that uses packetizers 900 and depacketizers 1000 according to FIGS. 9 and 10. In this embodiment, the CBR clients are CPRI streams. The packet transport is done with Ethernet.

A GPS unit provides a common time-of-day 1102 to all the centralized baseband units 1104. IEEE 1588 is used (PTP over Ethernet) to distribute this time-of-day from the baseband units 1104 to the remote radio units 1106. The GPS unit can also provide a corresponding clock that can be used as a frequency reference for the Ethernet PHYs of the packetizers 900 and distributed, through Synchronous Ethernet, to the depacketizers 1000.

In the uplink direction, from the remote radio unit 1106 to the baseband unit 1104, the packetizer 900 at the radio unit 1106 maps the CPRI clients into Ethernet frames. The Ethernet frames are then sent over an Ethernet switching network 1108 which will get them to their intended destination. The depacketizer 1000 at the destination then recovers the CPRI client, with its original clock, and sends it to the baseband unit 1104. The residence time of the CPRI client in the Ethernet domain (from its entrance into the packetizer to its departure from the depacketizer) is measured.

In the downlink direction, from the baseband unit 1104 to the remote radio unit 1106, the same processes take place.

The Ethernet domain residence times in both directions are given to the baseband unit. With the two residence times, the baseband unit can calculate the latency asymmetry between the uplink and downlink and compensate for it.

The systems and methods disclosed herein, which are implemented in the packetizers 900 and depacketizers 1000, dramatically reduce the delay of transporting the CPRI clients over the Ethernet network 1108 so it can satisfy the requirements for C-RAN Fronthaul applications.

Other Embodiments

The examples discussed above include a number of details that may not be present, or may be varied, in other embodiments. Devices that implement the systems and methods disclosed herein may support the following applications:

The TDM structure that defines which timeslots of which superblock belong to which client in the packet can be expanded so that it is carried over multiple superblocks and even over multiple packets. The increased size of this structure enhances its ability to carry more clients and support combinations of clients of very different rates without expanding the packet size. If the expansion is over multiple packets, an indication must be added to the packets to indicate which segment of the TDM structure is carried within the packet.

However, growth in the TDM structure size could decrease the delay reduction benefit as the time that a client has to wait for its timeslot to occur grows.

The mechanism used to identify which bytes are stuff bytes could be made more efficient than the one shown in the examples described above. A mechanism similar to that used in OTN to identify the upcoming stuffing pattern could be used instead.

The bytes associated with each client's timeslots could be more evenly distributed than in the examples of FIGS. 4 and 4A. Instead of placing the 8 bytes of one timeslot side-by-side, they could be interspersed with bytes of timeslots from other clients.

This type of byte distribution reduces the mapping delay by a small amount and reduces the burstiness of the data arrival at the destination node. This may help the CBR client clock recovery mechanism to produce a clock with better jitter and wander characteristics.

A method that allows the timeslot allocations to be changed dynamically without corrupting active clients could be provided to allow the packet network operator to more flexibly support its clients. It would allow any CBR client to change its rate without affecting other clients.

In the example Ethernet frame format of FIGS. 4 and 4A, another FCS field could be added before the first superblock to check the integrity of the Ethernet header fields, the Sequence Number, the Timestamp Channel #, and the Timestamp. This additional FCS, combined with the FCS in each superblock, would allow the entire contents of the Ethernet frame to be validated without using the FCS that resides at the end of the Ethernet frame.

CONCLUSION

The systems and methods disclosed herein reduce the delay of transporting CBR clients over a packet network while maintaining the ability to recover the frequency characteristics of the original CBR signal and measuring the residence time of the client in the packet network. The relative delay is reduced proportionally with the number of CBR clients that are to be packetized. The systems and methods disclosed herein only require changes to the endpoints of the network, where the CBR clients are packetized and depacketized. No changes are required to the packet switching network that resides between the endpoints. Moreover, use of systems and methods disclosed herein on multiple endpoints could also improve the delay performance of the packet switching network as it reduces the number of independent packet flows in the network.

The various embodiments of systems and methods disclosed herein illustrate specific implementations of the invention, but are not intended to be limiting. Various modifications to these embodiments and their use cases will be apparent to one of skill in the art.

In the preceding description, for purposes of explanation, numerous details are set forth in order to provide a thorough understanding of the embodiments disclosed herein. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for transparently transmitting multiple constant bitrate (CBR) data streams over a packet network with reduced delay, the method comprising:
defining a plurality of timeslots in a packet payload area, each timeslot comprising a predetermined number of consecutive bytes;
receiving a plurality of CBR data streams and separating each CBR data stream into a plurality of CBR data segments, each CBR data segment comprising a number of bytes less than or equal to the predetermined number of consecutive bytes in each timeslot of the packet payload area;
combining the plurality of CBR data streams into a single packet flow by time division multiplexing the CBR data segments into the timeslots of the packet payload area of each packet of a sequence of packets, such that the packet payload area of each packet contains a plurality of CBR data segments for each of the CBR data streams;
for each current packet of the sequence of packets, generating and inserting control data into the packet payload area of the current packet, the control data comprising:
timeslot occupation information indicating which bytes of each timeslot of the packet payload area of the current packet contain valid data from the corresponding CBR data segment, and
redundant timeslot occupation information indicating which bytes of each timeslot of the packet payload area of a previous packet in the sequence of packets contain valid data from the corresponding CBR data segment;
inserting a timestamp from a different one of the CBR data streams and an identification of which different one of the CBR data streams the timestamp corresponds to into a packet overhead area of at least some packets of the sequence of packets, such that the sequence of packets collectively include timestamps from each of the plurality of CBR data streams; and
sequentially transmitting the sequence of packets over the packet network.

2. The method of claim 1 further comprising partitioning each packet payload area into two or more sections, each of which contains a plurality of timeslots, timeslot occupation information for that section, and redundant timeslot information for a corresponding section of the previous packet, such that each section can be processed independently from other sections.

3. The method of claim 1 wherein the control data further comprises at least one alarm bit for each CBR data stream indicating whether an alarm condition exists on the corresponding CBR data stream.

4. The method of claim 1 wherein the packet overhead area of each packet includes a sequence number indicating a position of that packet in the sequence of packets.

5. A method for receiving multiple constant bitrate (CBR) data streams over a packet network with reduced delay, the method comprising:
receiving a single packet flow comprising a sequence of packets containing data from a plurality of CBR data streams, each current packet of the sequence of packets having a packet payload area comprising:
a plurality of timeslots, each timeslot comprising a predetermined number of consecutive bytes and containing a CBR data segment from a corresponding CBR data stream comprising a number of bytes less than or equal to the predetermined number of consecutive bytes,
timeslot occupation information indicating which bytes of each timeslot of the packet payload area of the current packet contain valid data from the corresponding CBR data segment, and
redundant timeslot occupation information indicating which bytes of each timeslot of the packet payload area of a previous packet in the sequence of packets contain valid data from the corresponding CBR data segment,
wherein a packet overhead area of at least some packets of the sequence of packets includes a timestamp from a different one of the CBR data streams and an identification of which different one of the CBR data streams the timestamp corresponds to, such that the sequence of packets collectively include timestamps from each of the plurality of CBR data streams;
extracting the CBR data segments from the timeslots and combining the CBR data segments from corresponding CBR data streams to reconstruct the CBR data streams; and
recovering a frequency of each of the CBR data streams based on the timestamps from each of the plurality of CBR data streams, the timeslot occupation information, and in response to detecting a dropped packet, the redundant timeslot occupation information.

6. The method of claim 5 wherein the packet overhead area of each packet includes a sequence number indicating a position of that packet in the sequence of packets, and detecting a dropped packet comprises detecting a discontinuity in sequence numbers of received packets.

7. The method of claim 5 wherein each packet payload area is partitioned into two or more sections, each of which contains a plurality of timeslots, timeslot occupation information for that section, and redundant timeslot information for a corresponding section of the previous packet, comprising processing each section independently from other sections.

8. A packetizer for transparently transmitting multiple constant bitrate (CBR) data streams over a packet network with reduced delay, the packetizer comprising:
a processor;
a frequency input for receiving a frequency reference signal;
a timing input for receiving a timing reference signal;
a timestamper connected to receive the timing reference signal from the timing input and generate a timestamp for each of a plurality of CBR data streams;
a clock rate comparer connected to receive the frequency reference signal from the frequency input and generate a rate indication for each of the plurality of CBR data streams;
a buffer for buffering payload data from each of the plurality of CBR data streams;
a time division multiplexing (TDM) controller connected to receive the rate indication for each CBR data stream from the clock rate comparer for that CBR data stream; and
a packet generator connected to receive payload data for each CBR data stream from the buffer for that CBR data stream, and to receive the timestamp for each CBR data steam from the timestamper for that CBR data stream, the packet generator configured to:

define a plurality of timeslots in a packet payload area, each timeslot comprising a predetermined number of consecutive bytes;

separate each CBR data stream into a plurality of CBR data segments, each CBR data segment comprising a number of bytes less than or equal to the predetermined number of consecutive bytes in each timeslot of the packet payload area;

combine the plurality of CBR data streams into a single packet flow by time division multiplexing the CBR data segments into the timeslots of the packet payload area of each packet of a sequence of packets under control of the TDM controller, such that the packet payload area of each packet contains a plurality of CBR data segments for each of the plurality of CBR data streams;

for each current packet of the sequence of packets, generate and insert control data into the packet payload area of the current packet, the control data comprising:
 timeslot occupation information indicating which bytes of each timeslot of the packet payload area of the current packet contain valid data from the corresponding CBR data segment, and
 redundant timeslot occupation information indicating which bytes of each timeslot of the packet payload area of a previous packet in the sequence of packets contain valid data from the corresponding CBR data segment; and insert the timestamp from a different one of the CBR data streams and an identification of which different one of the CBR data streams the timestamp corresponds to into a packet overhead area of at least some packets of the sequence of packets, such that the sequence of packets collectively include timestamps from each of the plurality of CBR data streams.

9. A depacketizer for receiving multiple constant bitrate (CBR) data streams over a packet network with reduced delay, the depacketizer comprising:

a processor;

a frequency input for receiving a frequency reference signal;

a timing input for receiving a timing reference signal;

a packet input for receiving a single packet flow comprising a sequence of packets containing data from a plurality of CBR data streams, each current packet of the sequence of packets having a packet payload area comprising:

a plurality of timeslots, each timeslot comprising a predetermined number of consecutive bytes and containing a CBR data segment from a corresponding CBR data stream comprising a number of bytes less than or equal to the predetermined number of consecutive bytes, timeslot occupation information indicating which bytes of each timeslot of the packet payload area of the current packet contain valid data from the corresponding CBR data segment, and redundant timeslot occupation information indicating which bytes of each timeslot of the packet payload area of a previous packet in the sequence of packets contain valid data from the corresponding CBR data segment, wherein a packet overhead area of at least some packets of the sequence of packets includes a timestamp from a different one of the CBR data streams and an identification of which different one of the CBR data streams the timestamp corresponds to, such that the sequence of packets collectively include timestamps from each of the plurality of CBR data streams;

a packet processor for detecting the timestamps from each of the plurality of CBR data streams and extracting the timeslot occupation information and the redundant timeslot occupation information from the packet payload area of each current packet and extracting the timestamps from the packet overhead of each current packet;

a buffer for buffering payload data from each of the plurality of CBR data streams;

an output for outputting each of the plurality of CBR data streams;

a time division demultiplexer connected to receive the timeslot occupation information and the redundant timeslot occupation from the packet processor for extracting the CBR data segments from the timeslots and combining the CBR data segments from corresponding CBR data streams to provide a reconstructed CBR data stream to the buffer; and a differentially recovered clock generator connected to receive the frequency reference signal from the frequency input and to receive the timestamps from the packet processor for determining a recovered frequency for each of the plurality of CBR data streams and controlling a clock rate of the output for each CBR data stream based on the recovered frequency for that CBR data stream.

* * * * *